United States Patent [19]

Pomichter, Jr.

[11] Patent Number: 5,371,843
[45] Date of Patent: Dec. 6, 1994

[54] METHOD AND SYSTEM FOR FILLING NON-COMPLEX POLYGONS USING VERTICAL SPANS

[75] Inventor: Gerald P. Pomichter, Jr., Saugerties, N.Y.

[73] Assignee: International Business Machines Corporation, Armonk, N.Y.

[21] Appl. No.: 962,441

[22] Filed: Oct. 16, 1992

[51] Int. Cl.5 .............................................. G06F 15/62
[52] U.S. Cl. .................................................... 395/141
[58] Field of Search ............... 395/140, 141, 142, 143, 395/16, 17, 18, 118, 119, 121, 133, 134, 113, 115

[56] References Cited

U.S. PATENT DOCUMENTS

| | | | |
|---|---|---|---|
| 4,481,594 | 11/1984 | Staggs et al. | 364/521 |
| 4,586,036 | 4/1986 | Thomason et al. | 340/720 |
| 4,626,838 | 12/1986 | Tsujioka et al. | 340/744 |
| 4,763,119 | 8/1988 | Matsubara et al. | 340/747 |
| 4,815,009 | 3/1989 | Blatin | 364/518 |
| 4,914,729 | 4/1990 | Omori et al. | 340/703 |
| 4,962,468 | 10/1990 | Beauregard et al. | 364/521 |
| 5,016,189 | 5/1991 | Yamada | 364/518 |
| 5,020,002 | 5/1991 | Malachowsky | 364/518 |
| 5,028,848 | 7/1991 | Bankston et al. | 315/364 |

OTHER PUBLICATIONS

J. D. Foley et al., "Fundamentals of Interactive Computer Graphics"; pp. 432–436 and 456–460 (1982).
O'Reilly & Associates, Inc., "X Protocol Reference Manual for X Version 11, Vol. O", pp. 115–116 (May 1990).

*Primary Examiner*—Phu K. Nguyen
*Attorney, Agent, or Firm*—Heslin & Rothenberg

[57] ABSTRACT

A method and system for rendering and filling non-complex polygon outlines using vertical span architecture. Three control planes are used to control the rendering and filling of pixels. These control planes include a fill control plane, which is filled with bits at locations corresponding to the first and last points of each vertical span of a polygon outline; an edge plane, which is filled with bits at locations corresponding to pixels having a center lying on an oblique edge of the polygon outline or having a center lying on a beginning or ending of each edge; and a Y direction plane, which is filled with bits indicating whether the edge is directed in a positive or negative Y direction at locations corresponding to the filled locations in the edge plane. The polygon is filled by proceeding along successive vertical spans, processing each span in accordance with the contents of the three control planes and the rendering orientation of the polygon outline.

37 Claims, 11 Drawing Sheets

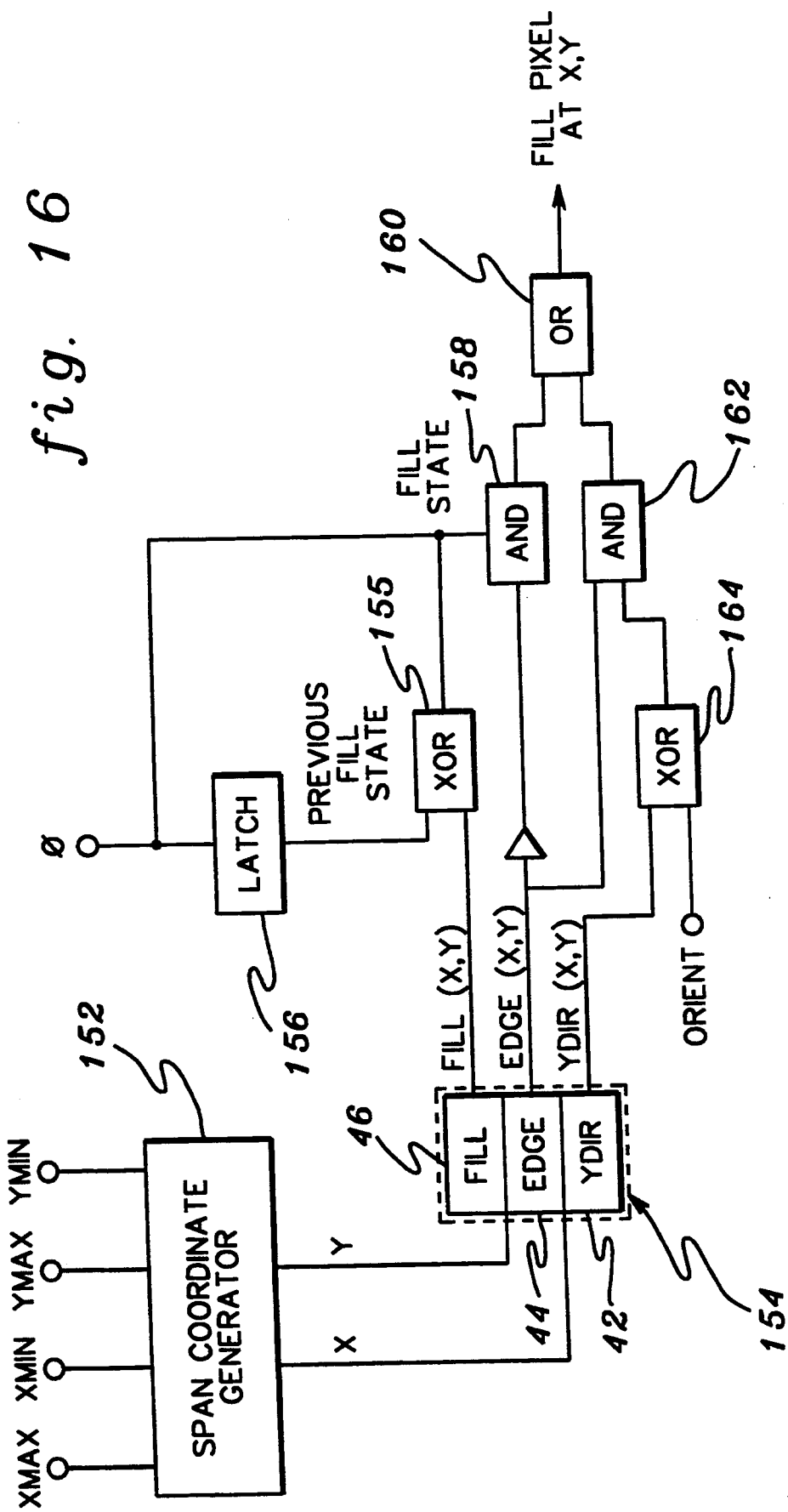

METHOD AND SYSTEM FOR FILLING NON-COMPLEX POLYGONS USING VERTICAL SPANS

TECHNICAL FIELD

This invention relates in general to graphics processing, and more particularly, to a technique for rendering and filling non-complex polygon outlines using vertical span architecture.

BACKGROUND ART

In graphics processing, the ability to render and fill polygons or images which are not blurred in an easy and efficient manner is important. Previously, various techniques for rendering and filling polygons have been implemented. These techniques include, for example, an Ordered Edge List algorithm and a Bresenham procedure, both of which are described in J. D. Foley et al., *Fundamentals of Interactive Computer Graphics* (1982). Many of the techniques known today render and fill polygons using a horizontal scan strategy. Others, use a vertical scan strategy.

One example of a filling technique using a horizontal scan technique is disclosed in U.S. Pat. No. 4,763,119, entitled "Image Processing System for Area Filling of Graphics," issued on Aug. 9, 1988 and assigned to International Business Machines, Corporation. In U.S. Pat. No. 4,763,119, an area fill technique for graphic images is disclosed, wherein the contour lines constituting an image are given in a series of line segments and horizontal line segments are ignored. The pixels of each line segment are stored in a work memory such that each line segment is represented by one pixel per horizontal line. An even number of contour line pixels exist in each horizontal line in the work memory and, area fill can be realized by scanning each horizontal line in the work memory and turning on pixel memory cells from an odd numbered contour line pixel to an even numbered contour line pixel.

In U.S. Pat. No. 4,626,838, entitled "Filled Shaped Generating Apparatus," issued on Dec. 2, 1986 and assigned to Hitachi, Ltd., an apparatus for filling an interior of a shape to be displayed on a raster scan CRT is disclosed. The apparatus includes a memory for storing information of starting points and ending points for filling. The write of a filling color code into the refresh memory is initiated and terminates in response to the filling starting point and ending point, respectively, but inhibited at its memory locations on the contour of the shape. The direction of the filling is perpendicular to the horizontal raster scanning of the CRT.

Many of the known rendering and filling techniques, especially those which are mostly hardware implemented, are not capable, however, of satisfying all of the known X Window EvenOdd fill rules, which are described in X Protocol Reference Manual for *X Version 11, Volume 0* by O'Reilly and Associates, Inc. (May 1990), which is hereby incorporated by reference. In addition, some of the rendering techniques are mostly software implemented and require complex data structures which are difficult to use and reduce the processing speed. Since, in graphic processing, it is advantageous to satisfy the X EvenOdd Rules and it is imperative to render and fill the polygons in an expedient manner, there exists a need for a rendering and filling technique which uses vertical span architecture to render and fill polygon outlines.

In addition, a need exists for a polygon rendering and filling technique which is capable of using vertical spans and is faster and less complex than previously implemented methods. Further, there exists a need for a rendering and filling technique which is capable of using vertical spans and still conform to the X EvenOdd fill rules. Still further, a need exists for a method and system that uses vertical span strategy for rendering and filling polygons in which a pixel on the edge of a polygon is drawn if, and only if, the interior of the polygon is to the right of the pixel or below the pixel. A yet further need exists for a polygon rendering and filling technique which does not need complex data structures and is capable of being implemented mostly in hardware using vertical span architecture.

DISCLOSURE OF INVENTION

The shortcomings of the prior art are overcome and additional advantages are provided in accordance with the principles of the present invention through the provision of a method for rendering a polygon outline.

A method for rendering a polygon outline having one or more edges in a graphics processor is described. Each of the edges is represented by one or more pixels and the polygon outline comprises N vertical spans. Each of the N vertical spans has a beginning point and an ending point. The rendering method includes setting bits to a first value in a first plane at locations corresponding to pixels representing the beginning point and the ending point of each of N−1 vertical spans; setting bits to the first value in a second plane at locations corresponding to pixels having a center lying on each oblique edge of the polygon outline and corresponding to pixels having a center lying on a beginning of each of the edges and an ending of each of the edges. A direction relative to the Y-axis for each bit set to the first value in the second plane is determined and bits are set in a third plane at locations corresponding to the set bits in the second plane. The bits in the third plane are set to the first value when the direction determining step indicates the direction of the set bits in the second plane is a first direction and the bits in the third plane are set to a second value when the direction determining step indicates the direction of the set bits in the second plane is a second direction.

In one embodiment, the bits are set to the first value in the first plane in accordance with a first plane predetermined relationship. The bits are set to the first value in the second plane in accordance with a second plane predetermined relationship, and the bits are set to the first value in the third plane in accordance with a third plane predetermined relationship.

In yet another embodiment of the invention, the pixels representing the polygon outline are identified. A beginning and ending coordinate for an edge of the polygon outline is determined, and a pixel closest to the edge defined by the beginning and ending coordinates is selected. Further, a determination is made as to whether the selected pixel is on or below the edge. If the selected pixel is not on or below the edge, a step in the Y direction is taken, thereby selecting another pixel to represent the edge. The above steps are repeated until the ending coordinate is reached for the last edge of the polygon outline.

In another embodiment of the invention, the rendered outline is filled. In one example, in order to fill the outline, a filling extent surrounding the outline is determined. The filling extent defines an area having a plurality of vertical scan lines. Each of the scan lines is vertically scanned to determine sets of active pixels in each vertical scan line and each set comprises a first and a second active pixel. In between the first and second active pixels are inactive pixels. For each vertical scan line, the first active pixels in each set of active pixels and each of the inactive pixels in between the set of active pixels are rendered.

In another example, filling the polygon outline includes, determining a location for filling to begin, determining whether the first value is stored at the location of the second plane, determining a rendering orientation (clockwise or counterclockwise) when the first value is stored at the location of the second plane, determining whether the first value is stored at the location of the third plane, filling the pixel when the rendering orientation is clockwise and the first value is stored at the location of the third plane, and filling the pixel when the orientation is counterclockwise and the first value is not stored at the location of the third plane.

In another example, the filling of the polygon outline includes determining a location for filling to begin, determining whether a fill indicator is equal to the first value and filling the pixel when the fill indicator is equal to the first value and the first value is not in the location of the second plane.

In another aspect of the invention, a system for rendering a polygon outline having one or more edges in a graphics processor is described. Each of the edges is represented by one or more pixels and the polygon outline comprises N vertical spans. Each of the N vertical spans has a beginning point and an ending point. The system includes means for setting bits to a first value in a first plane at locations corresponding to pixels representing the beginning point and the ending point of each of N−1 vertical spans, means for setting bits to the first value in a second plane at locations corresponding to pixels having a center lying on each oblique edge of the polygon outline and corresponding to pixels having a center lying on a beginning of each of the edges and an ending of each of the edges. In addition, means are included for determining a direction relative to the Y-axis for each bit set to the first value in the second plane and means for setting bits in a third plane at locations corresponding to the set bits in the second plane. The bits in the third plane are set to the first value when the direction determining means indicates the direction of the set bit in the second plane is a first direction and the bits in the third plane are set to a second value when the direction determining means indicates the direction of the set bit in the second plane is a second direction.

In another embodiment, the system includes means for identifying the pixels representing the polygon outline. In one example, the system includes means for determining a beginning and ending coordinate of an edge of the polygon outline, means for selecting a pixel closest to the edge, means for determining whether the selected pixel is on or below the edge, and means for stepping in a Y direction when the selected pixel is not on or below the edge.

In another embodiment, the system includes means for filling the rendered outline. In one example, the system for filling includes means for determining a location for filling to begin, means for determining whether the first value is stored at the location of the second plane, means for determining a rendering orientation (clockwise or counterclockwise) when the first value is stored at the location of the second plane, means for determining whether the first value is stored at the location of the third plane, means for filling the pixel when the rendering orientation is clockwise and the first value is stored at the location of the third plane, and means for filling the pixel when the orientation is counterclockwise and the first value is not stored at the location of the third plane.

In another example, the system for filling the polygon outline includes means for determining a location for filling to begin, means for determining whether a fill indicator is equal to the first value and means for filling the pixel when the fill indicator is equal to the first value and the first value is not stored at the location in the second plane.

BRIEF DESCRIPTIONS OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

FIG. 16 illustrates one example of the hardware components used in the filling technique of the present invention.

BEST MODE FOR CARRYING OUT THE INVENTION

Figure 1:
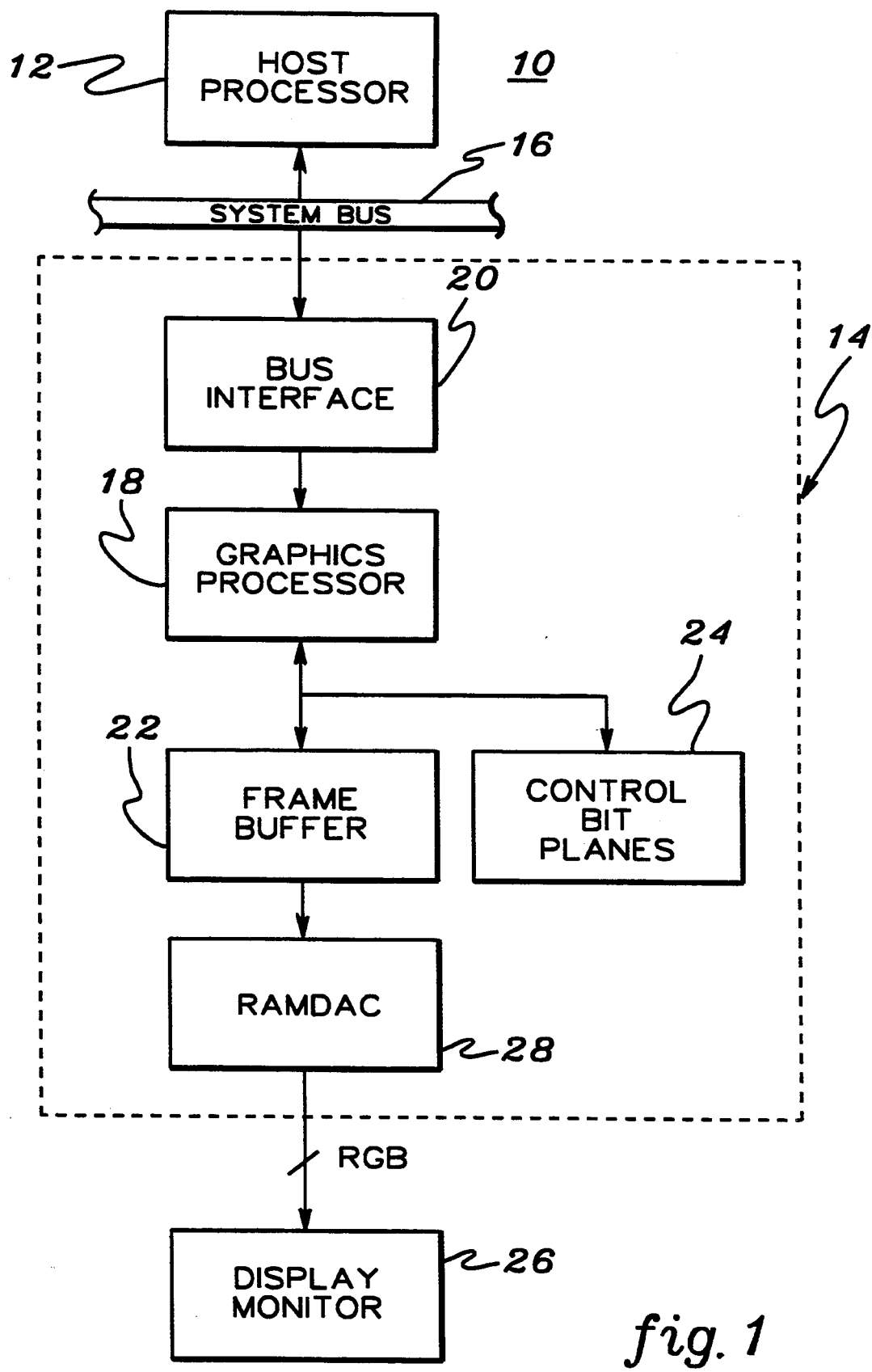
FIG. 1 depicts a block diagram of one embodiment of a computer graphics system incorporating the rendering and filling technique of the present invention.

Referring to FIG. 1, a system 10 incorporating the present invention includes a host processor 12 and a graphics adapter or subsystem 14 coupled to host processor 12 via a system bus 16. Host processor 12 may be a RISC-based processor, such as that of an International Business Machines RISC System/6000 workstation, while bus 16 may be a bus, such as the Micro Channel bus having a 32-bit data path. (RISC System/6000 and Micro Channel are trademarks of International Business Machines Corporation.)

In the particular example shown, graphics subsystem 14 includes a two-dimensional (2-D) graphics processor or raster engine 18 coupled to bus 16 via a bus interface 20. Graphics processor 18 is in turn coupled to a frame buffer 22, which stores color information for each picture element (pixel or pel) of a display and a plurality of control bit planes 24, described below. A typical display in a graphics workstation, such as in the RISC System/6000 referred to above, may span 1280 pixels horizontally and 1024 pixels vertically. Frame buffer 22 contains a predetermined number of bit planes for color information (8 and 24 planes are common numbers) and, optionally, additional planes for storing window information, overlay information, and the like.

Color information is periodically scanned out of frame buffer 22 along vertical scan lines and supplied to the color (RGB) inputs of a display monitor 26 via a RAMDAC 28. In a manner that is conventional in the art, RAMDAC 28 consists of a random access memory (RAM) (not separately shown) that is addressed by the color output from frame buffer 22 and whose output drives a digital-to-analog converter (DAC) for each of the RGB color components. The RAM of RAMDAC 28 functions as a color palette or lookup table for performing desired conversions between the output color from frame buffer 22 and the color supplied to monitor 26. Although in the system shown in FIG. 1 the display device is a monitor, the present invention may also be used with other display devices, such as printers.

Graphics processor 18, which includes the rendering and filling logic of the present invention, described in detail below, accepts data from host processor 12, which may represent a straight line segment or vector in terms of the coordinates of its endpoints, and "rasterizes" that data by converting it to a form suitable for storage in frame buffer 22 and ultimately display on monitor 26. In particular, graphics processor 18 renders an image outline and fills in the outline using the rendering and filling technique of the present invention.

Figure 2:
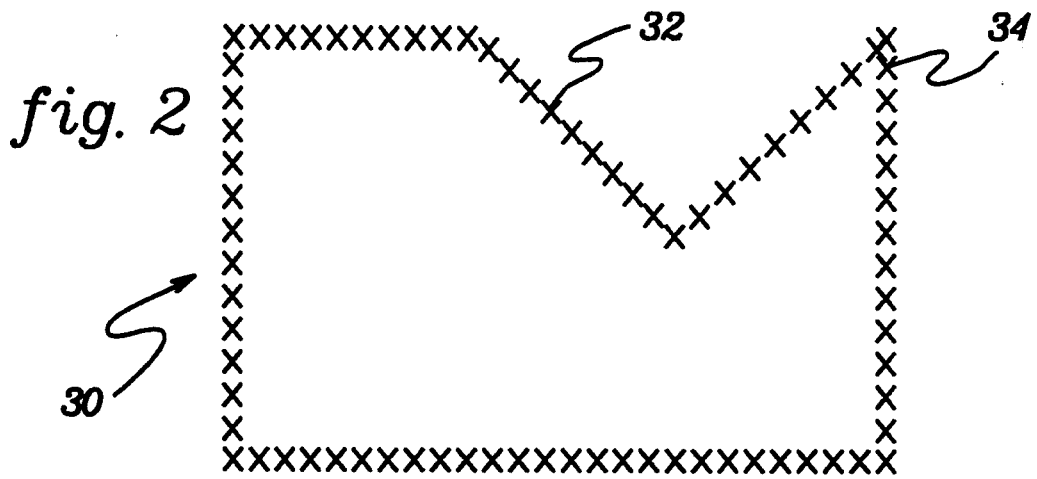
FIG. 2 illustrates one example of a polygon outline.

Referring to FIG. 2, a non-complex polygon outline 30 consists of one or more edges 32 and each of the edges is represented by a plurality of pixels 34. That is, one or more pixels are used to identify the ideal or true edge, such as edge 32. The polygon outline depicted in FIG. 2 is non-complex meaning that it is not self-intersecting. The technique of the present invention renders and fills non-complex polygon outlines.

Figure 3:
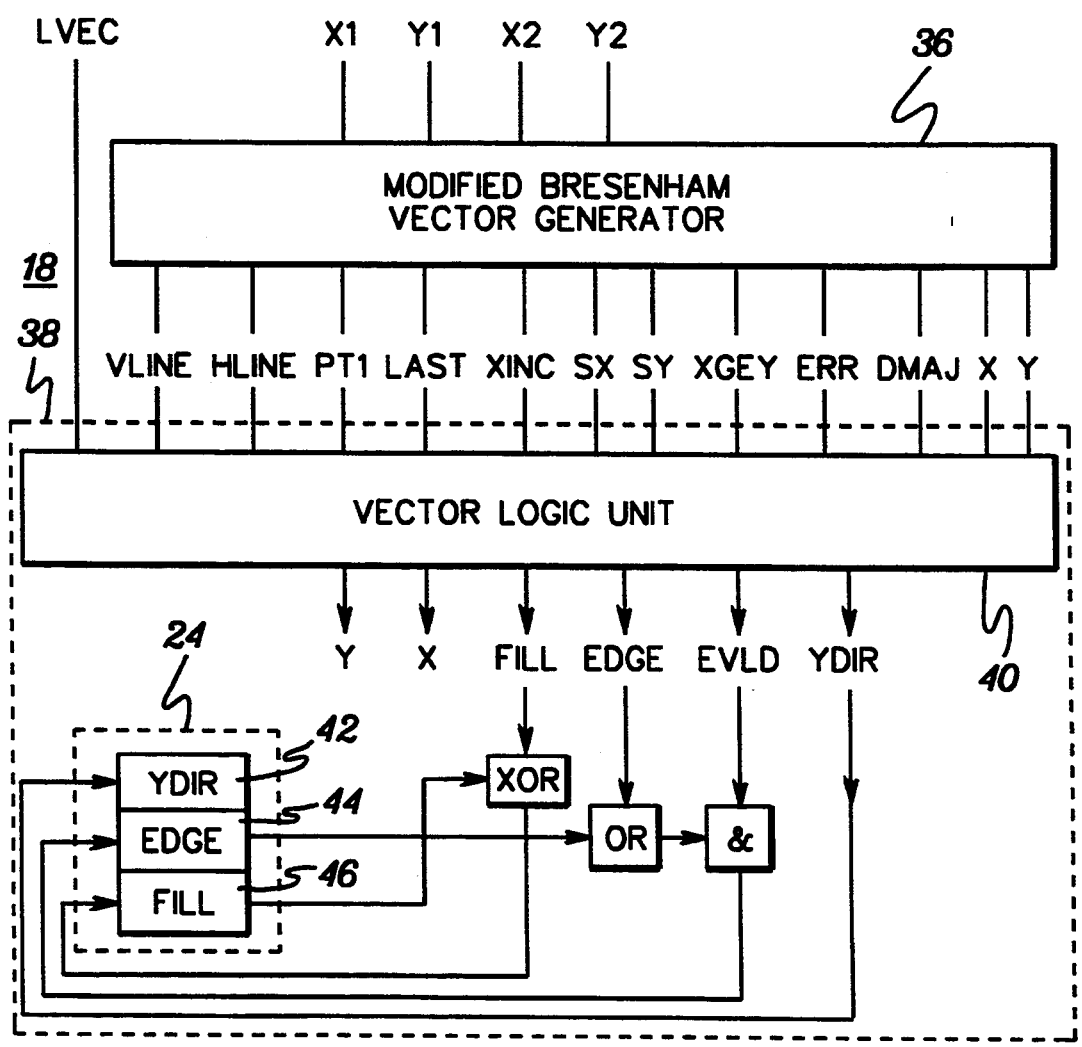
FIG. 3 depicts one example of a block diagram of the hardware components of the graphics processor of FIG. 1 used in the rendering technique of the present invention.

Referring to FIG. 3, graphics processor 18 includes, for example, a Bresenham vector generator 36 and a logic unit 38. Bresenham vector generator 36 uses a Bresenham procedure to generate addresses representing the pixels which define a particular edge 32. In particular, on each clock cycle, one address is generated, representing one pixel. One example of a Bresenham procedure is described in J. D. Foley et al., *Fundamentals of Interactive Computer Graphics* (1982), pp. 433–436, which is incorporated herein by reference. The above-mentioned Bresenham procedure is used to generate addresses for those pixels which are closest to the ideal edge. However, in accordance with the principles of the present invention, the Bresenham procedure is modified such that the addresses that are generated are those which represent pixels which are directly on the edge or below the edge. The manner in which this is accomplished is explained in detail below. The outputs produced from the modified Bresenham vector generator are input to logic unit 38, which includes the logic necessary to perform the rendering technique of the present invention.

In general, logic unit 38 includes, for example, a vector logic unit 40 and additional logic circuitry used in rendering polygon outlines. Vector logic unit 40, which includes a plurality of standard combinational logic circuits, receives as input the output of modified Bresenham vector generator 36, as well as one or more other signals, as described below, and produces therefrom values for a number of outputs of vector logic unit 40. The outputs of unit 40 include Y, X, FILL, EDGE, EVLD and YDIR, each of which is described in detail with reference to FIG. 5. Subsequently, several of the outputs of vector logic unit 40 are passed to additional circuitry in order to determine bit values to be input to control bit planes 24. In one example, control bit planes 24 include a Y direction control plane (YDIR) 42, an edge control plane (EDGE) 44 and a fill control plane (FILL) 46, each of which is described in detail below.

Referring to modified Bresenham vector generator 36 depicted in FIG. 3, each of the output parameters or signals generated by generator 36, including VLINE, HLINE, PT1, LAST, XINC, SX, SY, XGEY, ERR, DMAJ, X and Y, is described in detail in the following paragraphs.

VLINE is used to represent whether a particular edge of a polygon outline is a vertical edge. In order to determine this, a comparison is made between the horizontal component ($X_1$) of the beginning coordinate ($X_1, Y_1$) (in an X,Y coordinate system) and the horizontal component ($X_2$) of the ending coordinate ($X_2, Y_2$). If $X_1$ is equal to $X_2$, then the edge is a vertical edge and, in one instance, VLINE is set equal to one. Should $X_1$ not be equal to $X_2$, then VLINE is set to zero, indicating that the edge is not a vertical edge.

Similarly, HLINE is used to represent whether a particular edge is a horizontal edge. A comparison is made between the vertical component ($Y_1$) of the beginning coordinate ($X_1, Y_1$) and the vertical component ($Y_2$) of the ending coordinate ($X_2, Y_2$). If $Y_1$ is equal to $Y_2$, then the edge is a horizontal edge and HLINE is set equal to one, as an example. Further, if $Y_1$ is not equal to $Y_2$, then the edge is not horizontal and HLINE is set equal to zero.

PT1 represents the first point of an edge, and it is determined by the beginning coordinate ($X_1, Y_1$). That is, the pixel selected to represent the beginning coordinate of an edge is indicated as the first pixel of an edge, and PT1 is set to one. Otherwise, PT1 is set to zero, indicating that the address generated on this clock cycle does not represent the first pixel of an edge.

Similarly, LAST indicates the last point of a particular edge. For an edge designated by $(X_1, Y_1)$ and $(X_2, Y_2)$, LAST is set to one, indicating the last point of an edge when an address is generated for $(X_2, Y_2)$ of an edge.

SX is the sign of the X direction of a particular edge. The sign of the X direction is determined by a comparison of the horizontal components $(X_1, X_2)$ of the beginning and ending coordinates of an edge. Should $X_2$ be greater than $X_1$, then the edge is being drawn in a positive X direction and SX is set to zero. Should $X_2$ be less than $X_1$, then the edge is being drawn in a negative X direction and SX is set to one.

Likewise, SY indicates the sign of the Y direction of an edge. In one embodiment, it is assumed that the axis orientation is as follows:

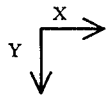

That is, Y is positive in the downward direction and X is positive in the horizontal direction to the right. Thus, the Y direction is positive when $Y_2$ is greater than $Y_1$, and it is negative when $Y_2$ is less than $Y_1$. In one example, when the Y direction is positive, SY is set to zero, and when the Y direction is negative, SY is set to one.

DMAJ represents the amount of movement along an edge in the major axis. As is known in the art, the major axis is the larger of the change in the X direction and the change in the Y direction. For example, if a beginning coordinate is (0,0) and an ending coordinate is (5,2), then DMAJ is equal to 5 since the change in the X direction $(dX=5=X_2-X_1)$ is greater than the change in the Y direction $(dY=2=Y_2-Y_1)$.

Similarly, DMIN represents an amount of movement along an edge in the minor axis. (DMIN is not shown as an output in FIG. 3, however, it is used in the calculation of ERR, described below, and thus, it is described at this point.) The minor axis is the smaller of the change in the X direction (dX) and the change in the Y direction (dY). Using the same examples as for DMAJ, DMIN is equal to 2.

Figure 4:
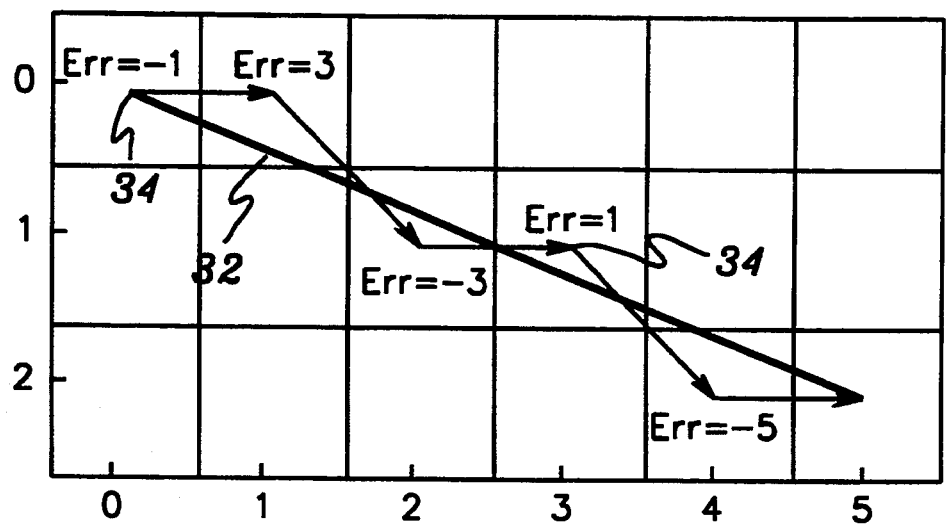
FIG. 4 illustrates one example of the Bresenham error determinant, which is used in accordance with the principles of the present invention.

ERR represents the difference between where the ideal edge is and the nearest pixel to the ideal edge. The calculation of ERR is described with reference to FIG. 4. Depicted in FIG. 4 is an ideal edge 32 and a number of pixels 34. Edge 32 begins at coordinate (0,0) and ends at coordinate (5,2). Initially, values for DMAJ and DMIN are calculated, as described above. In this example, DMAJ=5 and DMIN=2. Subsequently, an initial value for the error term, ERR, is calculated using the following equation:

$$\begin{aligned} ERR &= 2 \times DMIN - DMAJ \\ &= 2 \times 2 - 5 \\ &= -1 \end{aligned}$$

Then, on each clock cycle, ERR is used to determine whether the pixel to represent the ideal edge is determined by moving only in the major direction (e.g., X direction) or in the major and minor directions (e.g., X and Y directions). For example, at starting coordinate (0,0), the error term for that coordinate ERR (0,0) is determined. Since ERR (0,0)=ERR=−1, there is an increment only in the X direction. In other words, if ERR<0, then movement is only along the major axis and if ERR≧0, then movement is along the major and minor axis. Since X is incremented, the next position is (1,0) and ERR is incremented by INC1, which is equal to $2 \times DMIN = 4$.

Following with the above example, at coordinate (1,0), ERR (1,0)=ERR (0,0)+INC1=3. Since ERR is greater than 0, movement is along both axis to (2,1) and ERR is incremented by INC2, which is equal to $2 \times (DMIN - DMAJ) = -6$.

Similarly, at (2,1), ERR (2,1)=ERR (1,1)+(−6)32 −3. Again, since ERR is now negative, movement is along X to coordinate (3,1) and ERR is incremented by INC1 for coordinate (3,1). Thus, ERR (3,1)=ERR (2,1)+4=1. The above procedure continues on each clock cycle until the ending coordinate (5,2).

Returning to the additional outputs of the modified Bresenham generator, XINC is used to indicate whether or not there was an increment in the X direction. If such an increment took place, then XINC is set equal to one. Otherwise, it is set equal to zero.

X refers to the horizontal coordinate of the nearest pixel to the edge, and Y refers to the vertical coordinate of the nearest pixel to the edge. These terms are determined on each clock cycle.

The signal XGEY represents the situation wherein the change in X is greater than or equal to the change in Y. For instance, if a beginning coordinate of an edge is (4,2) and an ending coordinate is (8,3), then the change in X $(X_2-X_1=8-4=4)$ is greater than the change in Y $(Y_2-Y_1=3-2=1)$. Thus, in one example, XGEY is set to one. If the change in X is less than the change in Y, then XGEY is set to zero.

In addition to the above, LVEC, which is input to unit 40, indicates the last edge of the polygon outline. As is known in the art, when it is the end of a polygon outline, a command is sent to graphics processor 18 indicating the end. Similarly, FVEC (not shown) represents the beginning of a polygon outline, also indicated by a command.

Figure 5:
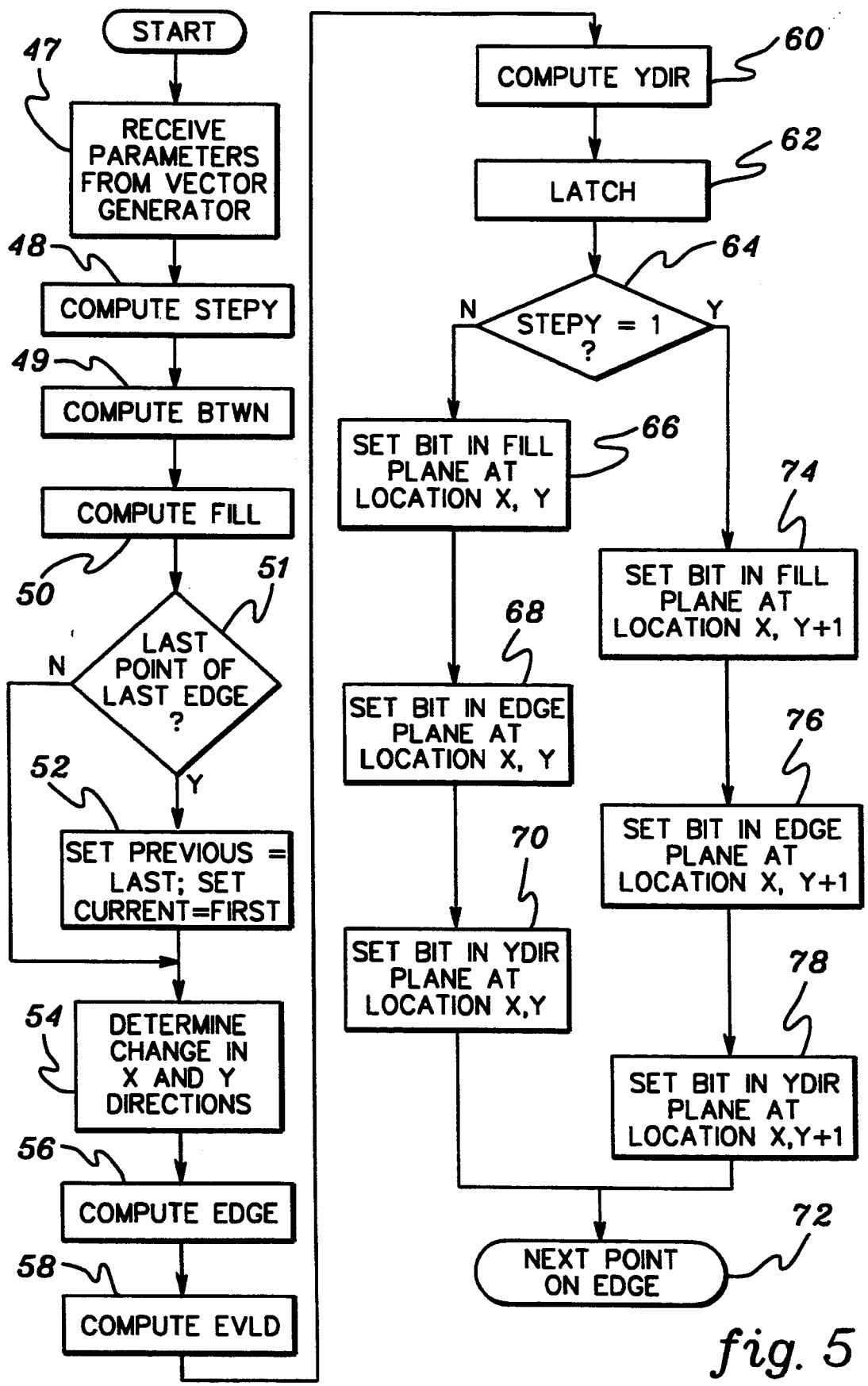
FIG. 5 depicts one embodiment of a logic flow diagram of the polygon outline rendering technique of the present invention.

Many of the above described signals are input into vector logic unit 40 and are used in the rendering technique of the present invention. Referring to FIG. 5, one embodiment of the technique for rendering a polygon outline, in accordance with the principles of the present invention, is described in detail. Initially, the signals, VLINE, HLINE, PT1, LAST, XINC, SX, SY, XGEY, ERR, DMAJ, X and Y, which were computed previously, are passed to vector logic unit 40 from vector generator 36, STEP 47 "RECEIVE PARAMETERS FROM VECTOR GENERATOR." In addition, the signal LVEC is input to unit 40.

Thereafter, using one or more of the above variables, a determination is made as to whether a step in the Y direction (STEPY) is to take place, STEP 48 "COMPUTE STEPY." That is, on each clock cycle the modified Bresenham generator indicates, by using ERR, which way to go for the next pixel nearest to the ideal edge. However, in accordance with the principles of the present invention, the pixel selected to represent the ideal edge is on the edge or below the edge. Therefore, STEPY indicates whether there needs to be an increment in the Y direction in order to satisfy the above position. Thus, if STEPY is set to one, an increment takes place and, if it is set to zero, no increment is to take place. In order to compute STEPY, the following equation is used:

$STEPY = (\neg XGEY\ \&\ \neg SY\ \&\ ((PGT0\ \&\ PLTD)$ or $(PGE\text{-}2D\ \&\ PLT\text{-}D)))$ or $(\neg XGEY\ \&\ SY\ \&\ ((PGT\text{-}D\ \&\ PLT0)$ or $(PGTD\ \&\ PLE2D)))$ or $(XGEY\ \&\ SY\ \&\ ((PGT0\ \&\ PLTD)$ or $(PGE\text{-}2D\ \&\ PLT\text{-}D)))$ or $(XGEY\ \&\ \neg SY\ \&\ ((PGT\text{-}D\ \&\ PLT0)$ or $(PGTD\ \&\ PLE2D)))$ XGEY and SY have been described previously and the remaining terms are described below:
- $\neg$ indicates boolean NOT operator;
- & refers to a boolean AND operator;
- OR indicates a boolean OR operator;
- PLT0 indicates whether or not the previous error is less than zero (the manner in which the previous error is set is described in further detail below);
- PGT0 indicates whether or not the previous error is greater than zero;
- PGTD indicates whether or not the previous error is greater than the change in the major axis (PE>DMAJ);
- PLTD represents whether or not the previous error is less than the change in the major axis (PE<DMAJ);
- PLT-D indicates whether or not the previous error is less than a negative change in the major axis (PE<−DMAJ);
- PGE-2D indicates whether or not the previous error is greater than or equal to a negative two times the change in the major axis (PE$\geq$−2×DMAJ);
- PGT-D indicates whether or not the previous error is greater than a negative change in the major axis (PE>−DMAJ);
- PLE2D represents whether or not the previous error is less than or equal to two times the change in the major axis (PE$\leq$2×DMAJ);

Using the above equation, a step in the Y direction is made when at least one of the following conditions exist:
(a) The change in X is less than the change in Y, the sign of the Y direction is positive, and the previous error is greater than zero and less than the change in the major axis;
(b) The change in X is less than the change in Y, the sign of the Y direction is positive, and the previous error is greater than or equal to a negative two times the change in the major axis and less than a negative change in the major axis;
(c) The change in X is less than the change in Y, the sign of the Y direction is negative, and the previous error is greater than a negative change in the major axis and less than zero;
(d) The change in X is less than the change in Y, the sign of the Y direction is negative, and the previous error is greater than the change in the major axis and less than or equal to two times the change in the major axis;
(e) The change in X is greater than or equal to the change in Y, the direction of Y is negative, and the previous error is greater than zero and less than the change in the major axis;
(f) The change in X is greater than or equal to the change in Y, the sign of the direction of Y is negative, and the previous error is greater than or equal to a negative two times the change in the major axis and less than a negative change in the major axis;
(g) The change in X is greater than or equal to the change in Y, the sign of the Y direction is positive, and the previous error is greater than a negative change in the major axis and less than zero;
(h) The change in X is greater than or equal to the change in Y, the sign of the Y direction is positive, and the previous error is greater than the change in the major axis and less than or equal to two times the change in the major axis.

Subsequent to computing STEPY, a couple of other signals used in the rendering technique of the present invention are computed. In particular, the value of a signal, referred to as BTWN, is calculated as follows, STEP 49 "COMPUTE BTWN":

$BTWN = XLAT\ \&\ (ERR > -DMAJ)\ \&\ (ERR \leq DMAJ);$

Wherein:

ERR and DMAJ are described above, and XLAT is used to represent whether on the previous clock cycle there was an increment in the X axis (i.e., XINC=1). If on the previous clock cycle there was an increment in X, then XLAT is set to one. Otherwise, it is set to zero.

Using the above equation, a determination is made as to whether an edge is on or passing between two pixel centers. If an edge is between two pixel centers, then BTWN is set to one. In particular, if there was an increment in the X axis on the previous clock cycle and the error determinant is greater than the negative of the value of the movement along the major axis and the error determinant is greater than or equal to the value of the movement along the major axis, then the edge is on or between the centers of two pixels.

In addition to calculating BTWN, a signal referred to as FILL is calculated as follows, STEP 50 "COMPUTE FILL":

$FILL = (BTWN\ or\ XGEY\ or\ PT1)\ and\ \neg VLINE\ and\ \neg RIGHT.$

The signals, BTWN, XGEY, PT1 and VLINE are all described in detail above. Further, the signal RIGHT is used to indicate whether the pixel is the rightmost pixel of a polygon edge and it is calculated using the following equation:

$RIGHT = (SX\ \&\ PT1)\ or\ (\neg SX\ \&\ LAST).$

Using the equation for RIGHT, if the pixel represents the first point of an edge and the sign of the X component of the edge is negative (e.g., SX=1) or if the pixel is the last pixel of the edge and the sign of the X component of the edge is positive, then RIGHT is set to one, indicating the pixel is the rightmost pixel of the polygon edge.

For each of the pixels of an edge, the fill indicator, FILL, is set to a binary one when at least one of the following conditions is met:
(a) Edge 34 is on or between two pixels, edge 34 is not a vertical edge and the pixel is not the rightmost pixel of the edge;
(b) The change in X is greater than or equal to the change in Y, the edge is not a vertical edge and the pixel is not the rightmost pixel of the edge;

(c) The pixel represents the first point of an edge, the edge is not a vertical edge and the pixel is not the rightmost pixel of the edge.

Subsequent to computing STEPY, BTWN and FILL, a determination is made as to whether the current pixel from vector generator 38 is the last pixel of the last edge of the polygon outline being rendered, INQUIRY 51 "LAST POINT OF LAST EDGE?" Should this be the last pixel of the last edge to be rendered, then the previous edge becomes the last edge, and the current edge becomes the first edge, STEP 52 "SET PREVIOUS=LAST; SET CURRENT=FIRST." In particular, within vector logic unit 40, a signal referred to as the previous horizontal edge, PH, is set equal to the current value calculated for HLINE and HLINE is then set equal to the value of FH, which represents whether the first edge is horizontal. In one embodiment, FH is set at the time graphics processor 18 indicates it is the first edge of a polygon and after HLINE is calculated for that edge. FH is set to the value of HLINE for the first edge. Likewise, a signal referred to as the previous vertical edge, PV, is set equal to the value calculated for VLINE and VLINE is set equal to the value of FV, which represents whether the first edge is vertical. This is accomplished in a similar manner to FH, except FV is set equal to the value of VLINE of the first edge.

In addition, in order to swap previous & last, and current & first, a signal representing the value of the sign of the X direction of the previous edge, PSX, is set equal to the value of SX and the sign of the Y direction of the previous edge, PSY, is set equal to SY. Further, SX and SY are set equal to signals, FSX and FSY, respectively. FSX represents the sign of the X direction for the first edge, and FSY represents the sign of the Y direction of the first edge. As with FH and FV, these variables are set at the time the first edge is determined. Subsequent to setting several variables in order to swap the previous & last, and current & first, or if this pixel was not the last point of the last edge (INQUIRY 51), flow passes to STEP 54 "DETERMINE CHANGE IN X AND Y DIRECTIONS."

In order to calculate the change in the sign of the X direction (XDC), the following equation is used:

$$XDC = \neg VLINE \,\&\, \neg PV \,\&\, (SX \text{ XOR } PSX).$$

Using the above equation (each of the signals are described previously; XOR refers to the boolean operator XOR), there is no change in the X direction if, for example, the edge is a vertical edge and/or if the previous edge was vertical. Further, there is no change in the X direction when the current and the previous value of the sign of the X direction are both positive or both negative. When there is no change in the X direction, XDC is set to zero. If, on the other hand, both the current edge and the previous edge are not vertical edges, and the sign of the X direction for the current edge is different from the sign of the X direction for the previous edge (i.e., one is positive and one is negative), then XDC is set to one, indicating a change in the sign of the X direction.

Similar to determining whether a change in the sign of the X direction has taken place, a determination is made as to whether a change in the sign of the Y direction (YDC) from the current edge to the previous edge has taken place. In order to compute this, the following equation is used:

$$YDC = \neg HLINE \,\&\, PH \,\&\, (SY \text{ XOR } PSY)$$

(Each of the above variables have been described previously.) As with XDC, if there is a change in the sign of the Y direction, then YDC is set to one and, if no change exists, then YDC is set to zero. There is no change in the Y direction if, for example, the edge is a horizontal edge and/or the previous edge was horizontal. Further, there is no change in the Y direction when the current and the previous value of the sign of the Y direction are both positive or negative. If, on the other hand, both the current edge and the previous edge are not horizontal edges and the sign of the Y direction for the current edge differs from the sign of the Y direction for the previous edge, YDC is set to one.

In one embodiment, subsequent to computing whether there exists a change in the X direction or the Y direction, a determination is made as to whether the pixel being rendered represents an edge of the polygon, STEP 56 "COMPUTE EDGE." In particular, the signal, EDGE, is set to one when the pixel is to represent an edge of the polygon, as described in detail below, and EDGE is set to zero when the pixel is not to represent an edge of the polygon outline.

In order to make the above determination, the following equation is used:

$$EDGE = CENTER \,\&\, \neg(HLINE \,\&\, \neg(PT1 \text{ or } LLV)) \,\&\, \neg(VLINE \,\&\, \neg(PT1 \text{ or } LAST)).$$

Referring to the above equation, HLINE, VLINE, PT1 and LAST have been explained previously. In addition, LLV indicates the last point of the last edge of the polygon outline and CENTER represents whether the center of the pixel being rendered is exactly on an edge of the polygon outline. CENTER is calculated by the following equation:

$$CENTER = (PE = DMAJ) \text{ or } (PE = -DMAJ).$$

In particular, if the previous error is equal to the change in the major direction or a negative change in the major direction, CENTER is set to one. Otherwise, it is set to zero.

Using the above formula for EDGE, a pixel represents an edge if the center of the pixel is on the edge and the current edge is not a horizontal line and the current edge is not a vertical line (i.e., the edge is oblique). In addition, a pixel represents an edge if the center of the pixel is on a beginning or ending point of the edge. A pixel represents an edge if the center of the pixel is on the edge, the current edge is horizontal and the pixel is either the first pixel of the edge or last pixel of the polygon outline, the current edge is vertical and the pixel is either the first or last pixel of the the current edge. However, a pixel does not represent an edge if the center of the pixel is not on the edge. In addition, a pixel does not represent an edge if the current edge is a horizontal edge and the pixel is not the first pixel of an edge or last pixel of the outline. Further, a pixel does not represent an edge if the current edge is vertical and the pixel is not the first or last pixel of the edge.

In addition to the above, an edge valid signal is computed, which is used at a later point in the rendering technique to determine if the particular pixel should be represented in edge control plane 44, STEP 58 "COM- PUTE EVLD." The edge valid signal (EVLD) is computed using the following function:

EVLD= ((PT1 or LLV) and XDC and YDC).

Each of the variables in the EVLD equation has been described previously and, therefore, will not be described at this point.

Using the above equation, the edge valid signal is set to zero indicating an invalid signal when the pixel is either the first pixel of an edge or the last point of the last edge of a polygon outline, or both, and there is a change in both the X direction and the Y direction. The edge valid signal is set to one, indicating a valid signal when, for example, there is no change in the X or Y directions, regardless of the value of PT1 or LLV. Further, EVLD is set to one when PT1 and LLV equal zero, specifying the pixel is not the first point of an edge and the pixel is not the last point of the polygon outline.

Subsequent to computing EDGE and EVLD, a signal, referred to as YDIR, is calculated STEP 60 "COMPUTE YDIR." (It will be apparent to one of ordinary skill in the art that the order in which EDGE, EVLD and YDIR are computed can be varied.) YDIR is used to determine the sign of the Y direction for specific pixels, as described below. If an edge points in the positive Y direction, YDIR is set to zero, and if the edge points in the negative Y direction, then YDIR is set to one. For pixels at the intersections of polylines (start and end points of an edge), a boolean function is used to determine whether YDIR for the pixel at the joint of the intersection should be set to zero or one. The following predetermined relationship determines the value of YDIR at any point:

$YDIR = (\neg PT1\ \&\ \neg LLV\ \&\ SY)$ or $((PT1\ or\ LLV)\ \&\ ((\neg H2\ \&$ $\neg V2\ \&\ ((SY\ \&\ \neg PSX)$ or $(SY\ \&\ PSY)$ or $(PSY\ \&\ SX)))$ or $(HLINE\ \&\ (\neg SX\ or\ (SX\ \&\ PSY)))$ or $(PH\ \&\ \neg PSX\ \&\ SY)$ or $(VLINE\ and\ \neg H2\ \&\ ((PSX\ \&\ PSY)$ or $(\neg PSX\ \&\ SY)))$ or $(PV\ \&\ \neg H2\ \&\ ((PSY\ \&\ SX)$ or $(\neg SX\ \&\ SY)))))$.

Many of the above variables have been described above. However, H2 and V2 have not been previously described. H2 represents whether the current or the previous edge is horizontal and is determined by OR'ing the value of PH and HLINE. Similarly, V2 represents whether the current or the previous edge is vertical and it is determined by OR'ing PV and VLINE.

Figure 6:
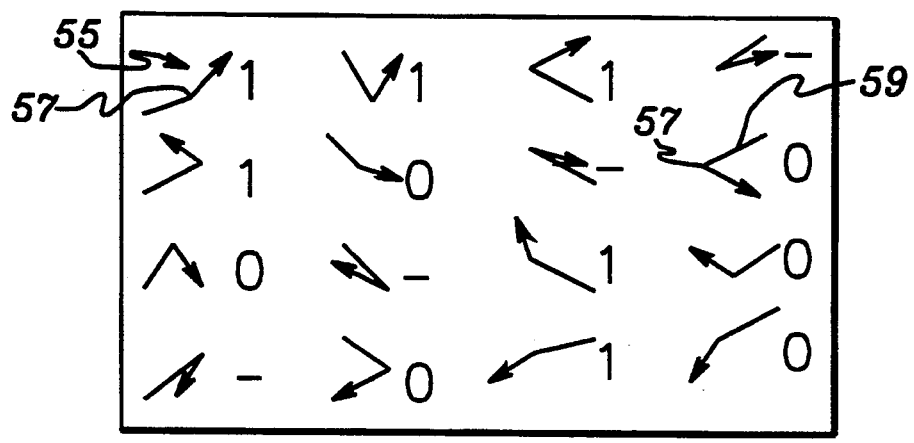
FIG. 6 illustrates various examples of the direction of Y at the endpoints of edges, in accordance with the principles of the present invention.
Figure 7:
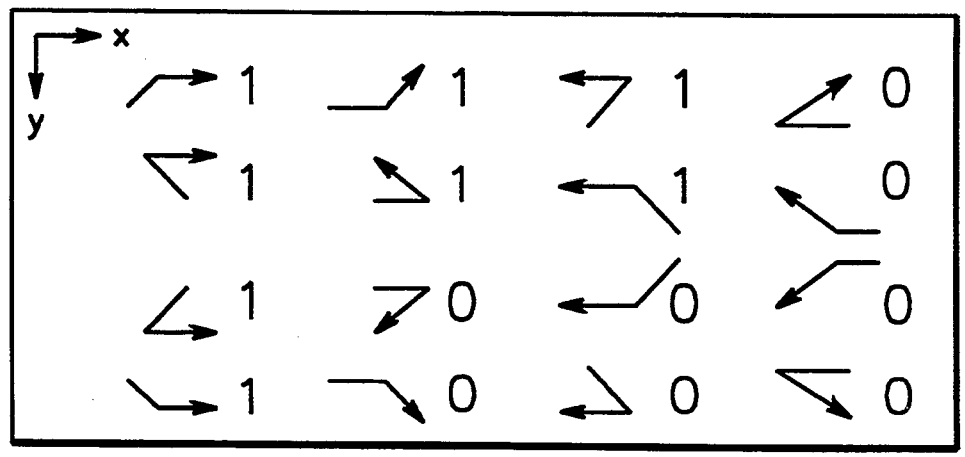
FIG. 7 illustrates various examples of the direction of Y when one of the edges is horizontal, in accordance with the principles of the present invention.
Figure 8:
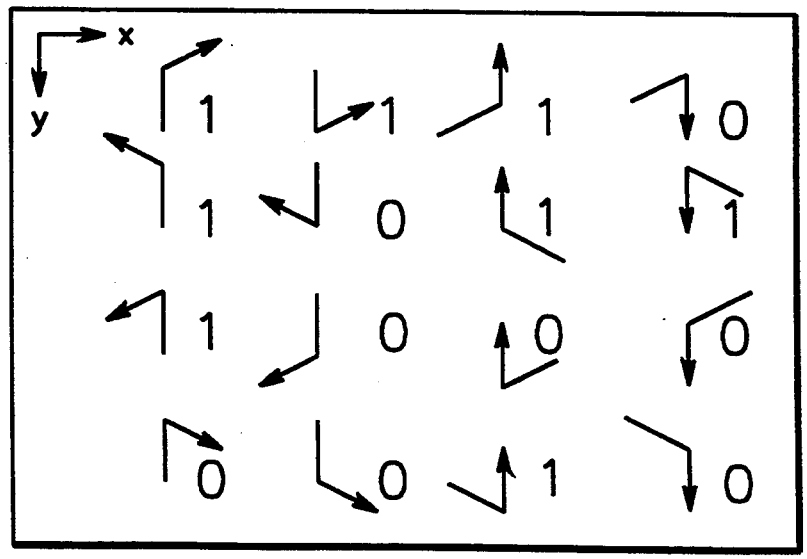
FIG. 8 illustrates various examples of the direction of Y when one of the edges is vertical, in accordance with the principles of the present invention.

For ease of understanding the above equation for YDIR, reference is made to FIGS. 6–8. FIG. 6 depicts various examples of the results obtained from the above equation for endpoints of edges. In FIG. 6, 1 refers to a negative Y direction, 0 refers to a positive Y direction, and - is a don't care condition. Referring to FIG. 6, in one example (reference number 55), from joint or endpoint 57, the edge is pointing in the negative direction and, thus, YDIR is set to one. As another example (reference number 59) from endpoint 57, the edge is pointing in the positive direction and thus YDIR is set to zero. For a don't care condition, YDIR is set to either one or zero.

Similarly, in FIG. 7, examples are given of the results obtained from the above YDIR equation when a horizontal edge is involved and FIG. 8 depicts examples of the results obtained when a vertical edge enters into the calculation.

Returning to FIG. 5, subsequent to computing YDIR, the value for XINC is latched into the signal XLAT and the value of ERR is latched into the signal PE in order to preserve for the next clock cycle an indication of what happened during the previous clock cycle, STEP 62 "LATCH."

Next, an inquiry is made as to whether there is a step in the Y axis, INQUIRY 64 "STEPY=1?" Should there be no step in the Y axis, then control bit planes 24 are updated at location X,Y (X and Y are output from vector logic unit 40). In particular, location X,Y in fill plane 46 is set to the value resulting from the following fill plane predetermined relationship, STEP 66 "SET BIT IN FILL PLANE AT LOCATION X,Y":

FILL PLANE (X,Y)=FILL PLANE (X,Y) XOR FILL

Using the above equation, location X,Y of fill plane 46 is set to the value resulting from the exclusive OR of the value already stored in location X,Y (initially, all locations of fill plane 46 are set to zero) with the value of FILL previously determined. In one embodiment, a location representing a pixel which represents the beginning or ending point of a vertical span of a polygon outline, except the rightmost vertical span, is set (e.g., set to one).

Similarly, location X,Y of edge plane 44 is set to the value resulting from the following edge plane predetermined relationship, STEP 68 "SET BIT IN EDGE PLANE AT LOCATION X,Y":

EDGE PLANE (X,Y)=(EDGE PLANE (X,Y) OR EDGE) AND EVLD.

The value stored at location X,Y of the edge plane is equal to the value resulting from the OR'ing of EDGE, previously determined, and the value currently stored at location X,Y of edge plane 44, the result of which is AND'ed with the value of EVLD, also previously determined.

In addition, location X,Y of YDIR plane 42 is set equal to the value of YDIR, calculated above, STEP 70 "SET BIT IN YDIR PLANE AT LOCATION X,Y."

Subsequent to setting the bits in control planes 24 for location X,Y, the above procedure is repeated for the next point on the edge, STEP 72 "NEXT POINT ON EDGE."

Returning to INQUIRY 64, should STEPY be equal to one, indicating there was a step in the Y axis, location X,Y+1 is set in control planes 24. In particular, the following equations are used to set the bits at location X,Y+1 in fill plane 46, edge plane and YDIR plane 42, respectively:

FILL PLANE (X,Y+1)=FILL PLANE (X,Y+1) XOR FILL;

EDGE PLANE (X,Y+1)=(EDGE or Edge Plane (X,Y+1) and EVLD;

YDIR (X,Y+1)=YDIR

These equations are similar to the ones described previously for location X,Y except that X,Y is replaced by X,Y+1. Subsequent to setting the bits at location X,Y+1 in each of control planes 24, flow passes once again to STEP 72 "NEXT POINT ON EDGE."

Figure 9:
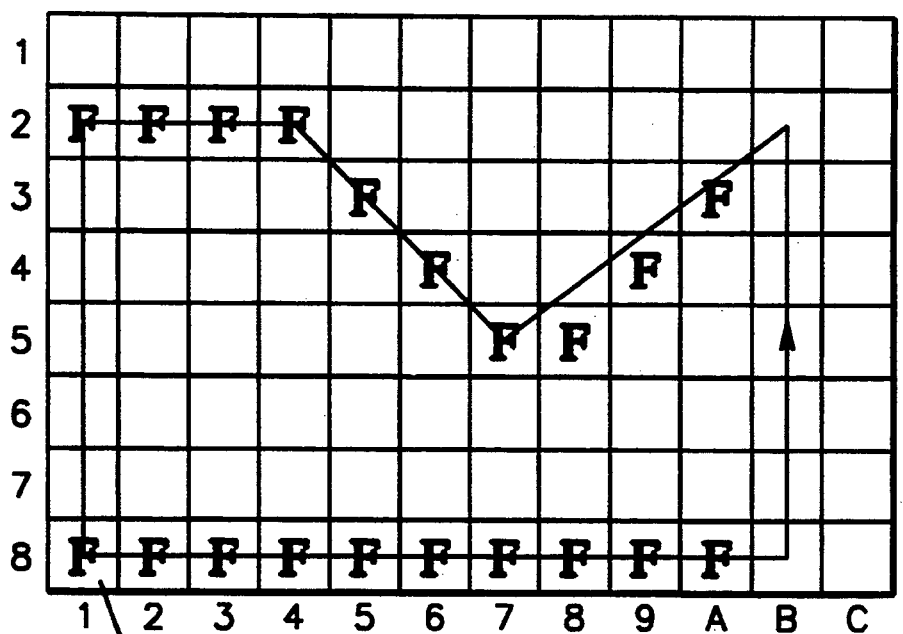
FIG. 9 depicts one example of the locations filled in a fill control plane, in accordance with the principles of the present invention.
Figure 10:
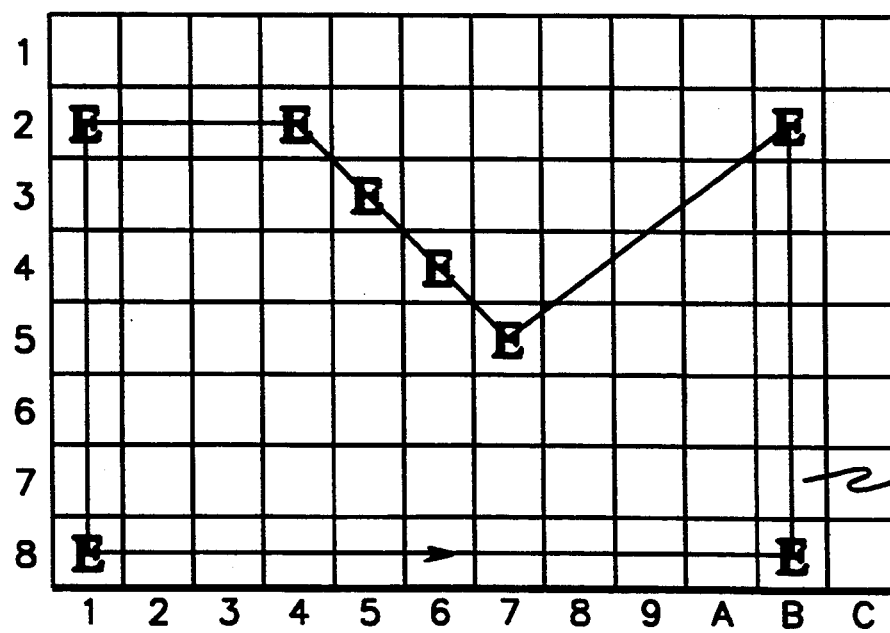
FIG. 10 depicts one example of the locations filled in an edge plane, in accordance with the principles of the present invention.
Figure 11:
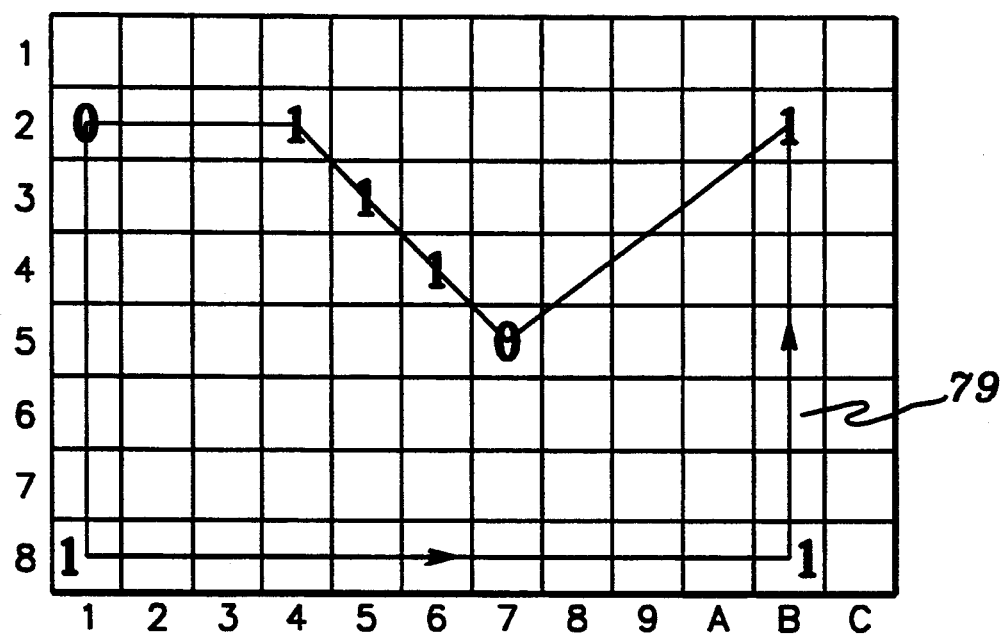
FIG. 11 depicts one example of the locations filled in a Y direction plane, in accordance with the principles of the present invention.

FIGS. 9-11 depict one example of the locations that would be set in fill plane 46, edge plane 44 and YDIR plane 42, respectively. In each figure, a pixel is represented by a square 79 and the polygon outline shown is represented by 11 horizontal pixels (1-B) and 7 vertical pixels (2-8). For each location to be set to one in the fill plane, an "F" is shown in FIG. 9. Likewise, for each location to be filled in the edge plane, an "E" is depicted, and for each location in the YDIR plane, either a "1" or "0" is shown. As illustrated in FIGS. 10 and 11, the locations set in the YDIR plane (to either a 0 or 1) correspond to those locations set to one (or E) in the edge plane.

Described in detail above is the rendering technique of the present invention. The hardware used, in one embodiment, in order to implement the logic of the rendering technique is described in detail herein with reference to the block diagram of FIGS. 12a and 12b. For readability of FIGS. 12a and 12b, some of the connecting lines are not drawn and instead, the label of an input line is repeated. For instance, the output of multiplexer 102 (FIG. 12a), described below, is HLINE. However, lines are not drawn from 102 to, for example, unit 100 (FIG. 12b), instead, an input line labelled HLINE is added. This is merely to facilitate understanding of the diagrams.

Figure 12A:
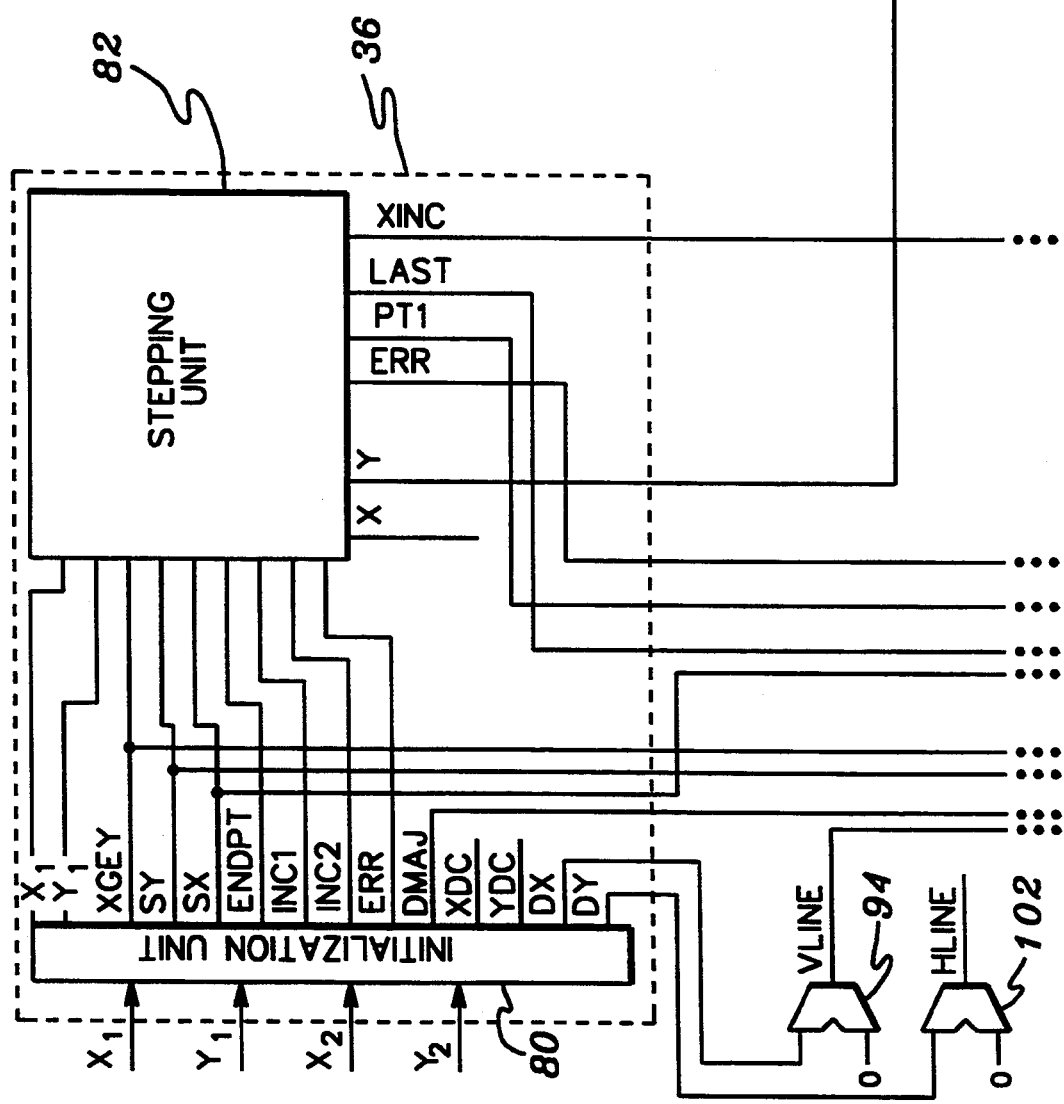
FIGS. 12a, 12b depict one embodiment of a block diagram of the hardware components used in the rendering technique depicted in FIG. 5, in accordance with the principles of the present invention.

As depicted in FIG. 12a, modified Bresenham vector generator 36 includes, for instance, an initialization unit 80 and a stepping unit 82. Each of the units comprises a number of standard combinational logic circuits (e.g. OR gates, AND gates, inverters and comparators) used in determining a value for many of the signals.

Initialization unit 80 receives as input beginning coordinate ($X_1$, $Y_1$) and ending coordinate ($X_2$, $Y_2$) and outputs therefrom $X_1$, $Y_1$, XGEY, SY, SX, dX, dY, INC1, INC2, ERR, DMAJ, XDC, YDC all described above, as well as ENDPT, which is described below.

ENDPT refers to the end of a particular edge. If X is the major axis, then ENDPT is set equal to $X_2$, otherwise, it is set equal to $Y_2$.

Stepping unit 82 receives as input $X_1$,$Y_1$, XGEY, SY, SX, ENDPT, INC1, INC2 and ERR and produces therefrom X, Y, ERR, PT1, LAST and XINC, all described above. Each of these outputs is input to one or more logic circuits, as described below.

In one embodiment, Y is input to a calculation Y unit 84, which is used to increment Y based on the calculation of STEPY, which is input to Y unit 84 from a calculate STEPY unit 88, described below.

Further, ERR and XINC are input to a latch 86 which latches on each clock cycle the values of ERR and XINC into the signals PE and XLAT respectively. This enables the values of ERR and XINC to be saved for the next cycle, thereby providing an indication of what occurred on the previous clock cycle. The output of latch 86, specifically the value of PE, is input to calculate STEPY unit 88. Also input to unit 88 are signals XGEY, DMAJ and SY. PE, XGEY, DMAJ and SY are used to compute the value of STEPY, which represents whether there is an increment in the Y direction in order to obtain a pixel on or below the edge.

The second output of latch 86, namely XLAT, is input to calculate BTWN unit 90. Also input to unit 90 is ERR and DMAJ. BTWN, DMAJ and ERR are used to determine whether the edge is passing between two pixel centers. Further, the value of BTWN is input to calculate FILL unit 92 and is used in determining whether the fill control plane is to be filled. Those locations filled in the control plane correspond to the nearest pixel below or on the ideal edge, as described above, and thus the value of BTWN assists in indicating whether the edge is passing between two pixel centers.

Also input to calculate fill unit 92 are the signals VLINE, PT1, XGEY and RIGHT. VLINE is output from a multiplexer 94, which receives as input from initialization unit 80, the change in Y (dy). If the change in Y is zero, then the edge is vertical. VLINE, PT1, XGEY and RIGHT are used to calculate FILL, as described with reference to the flow diagram of 5.

RIGHT is output from a calculate RIGHT unit 96, which receives as input PT1 and LAST, both of which are output from stepping unit 82, and SX, which is output from initialization unit 80.

The PE output of latch 86 is also input to a calculate CENTER unit 98, the output of which (i.e., the value of CENTER) is passed to a calculate EDGE unit 100, which contains the logic circuits used in determining the value of EDGE, also described previously.

Figure 12B:
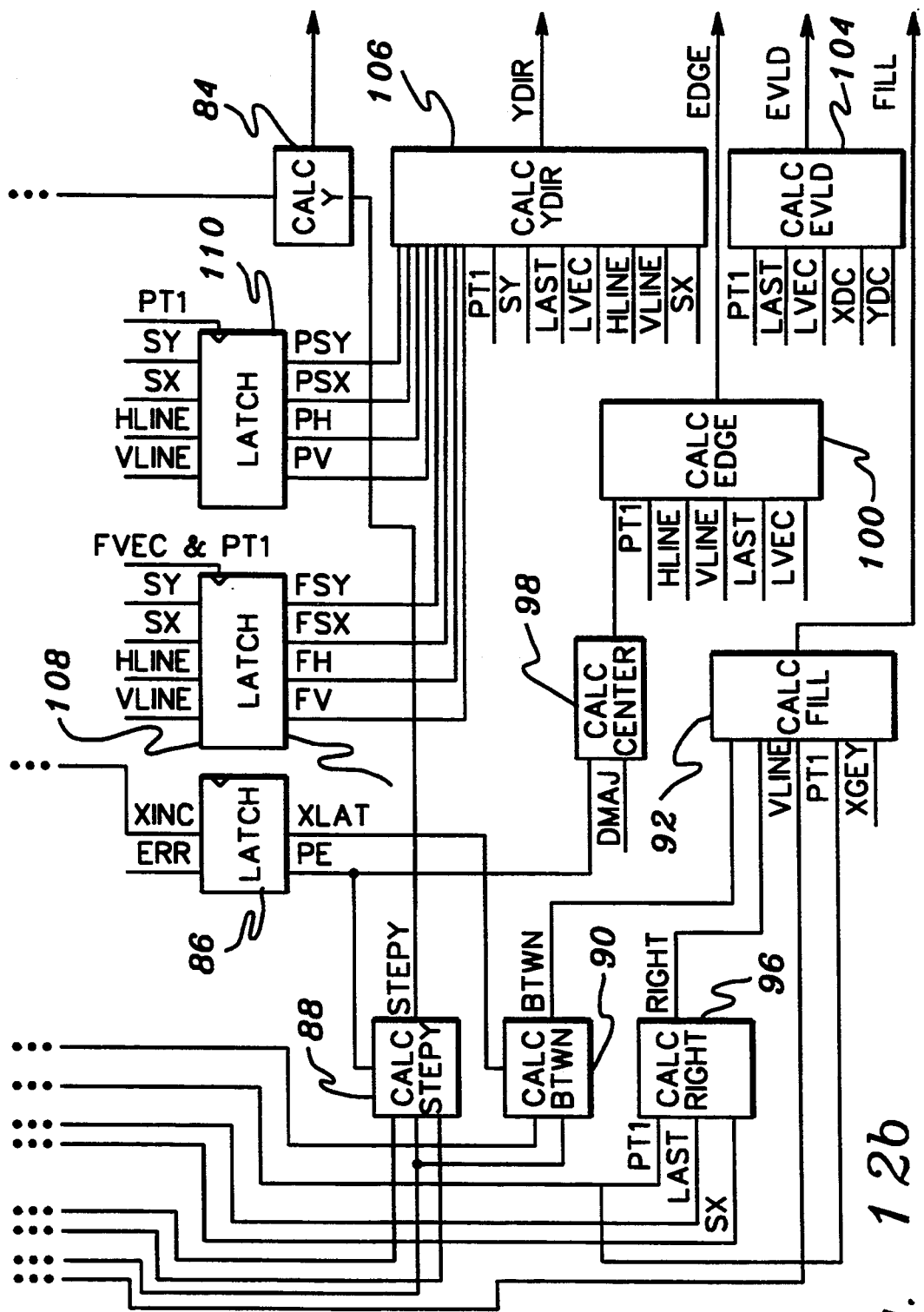

In addition to receiving CENTER as an input, calculate EDGE unit 100 also receives as input the signals, PT1 and LAST, which are outputs of stepping unit 82, LVEC, which is input to graphics processor 18, VLINE, which is the output of multiplexer 94 and HLINE, which is the output of multiplexer 102. As shown in FIG. 12b, the input of multiplexer 102 is dY. If dY is equal to zero, then HLINE is equal to one.

Further, as depicted in FIG. 12b, there exists a calculate EVLD unit 104, which receives as input PT1, LAST, LVEC (LAST AND LVEC=LLV), XDC and YDC. The logic circuits of unit 104, including OR gates, AND gates and inverters are used to produce the output value of EVLD.

Further, a calculate YDIR unit 106 is used to determine the value of YDIR. Unit 106 receives as input the signals FV, FH, FSX and FSY, which are all output from a latch 108; signals PV, PH, PSX and PSY, which are output from a latch 110; the signals HLINE and VLINE output from multiplexers 102 and 94, respectively; and PT1, LAST and LVEC, output from stepping unit 82. These signals, along with a couple of other signals described above, are used to determine for each location set in the EDGE plane, the Y direction of the pixels represented by those locations.

Latch 108, mentioned previously, receives as input VLINE and HLINE, and SX and SY, which are output from initialization unit 80. The values of VLINE, HLINE, SX and SY are latched when the value of FVEC AND'ed with PT1 is a one. When the result of FVEC AND'ed with PT1 is one, VLINE is latched into FV, HLINE into FH, SX into FSX and SY int FSY.

Latch 110 receives as input VLINE, HLINE, SX and SY, which are latched when PT1 is equal to one. When PT1 is set to one, VLINE is latched into PV, HLINE into PH, SX into PSX and SY into PSY.

Subsequent to filling each of control planes 24 (i.e., fill control plane 46, edge control plane 44 and Y direction control plane 42), as described above, the polygon outline which is represented in the control planes is filled, in accordance with the principles of the present invention. The technique for filling the polygon outline is described in detail with reference to the flow diagram of FIG. 13.

Figure 14:
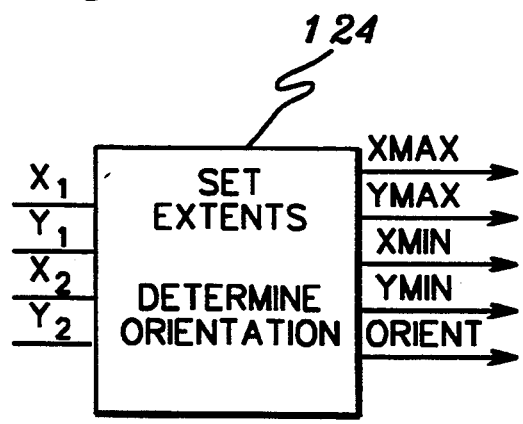
FIG. 14 depicts one example of the hardware circuit used in determining the filling extents and rendering orientation, in accordance with the principles of the present invention.
Figure 13:
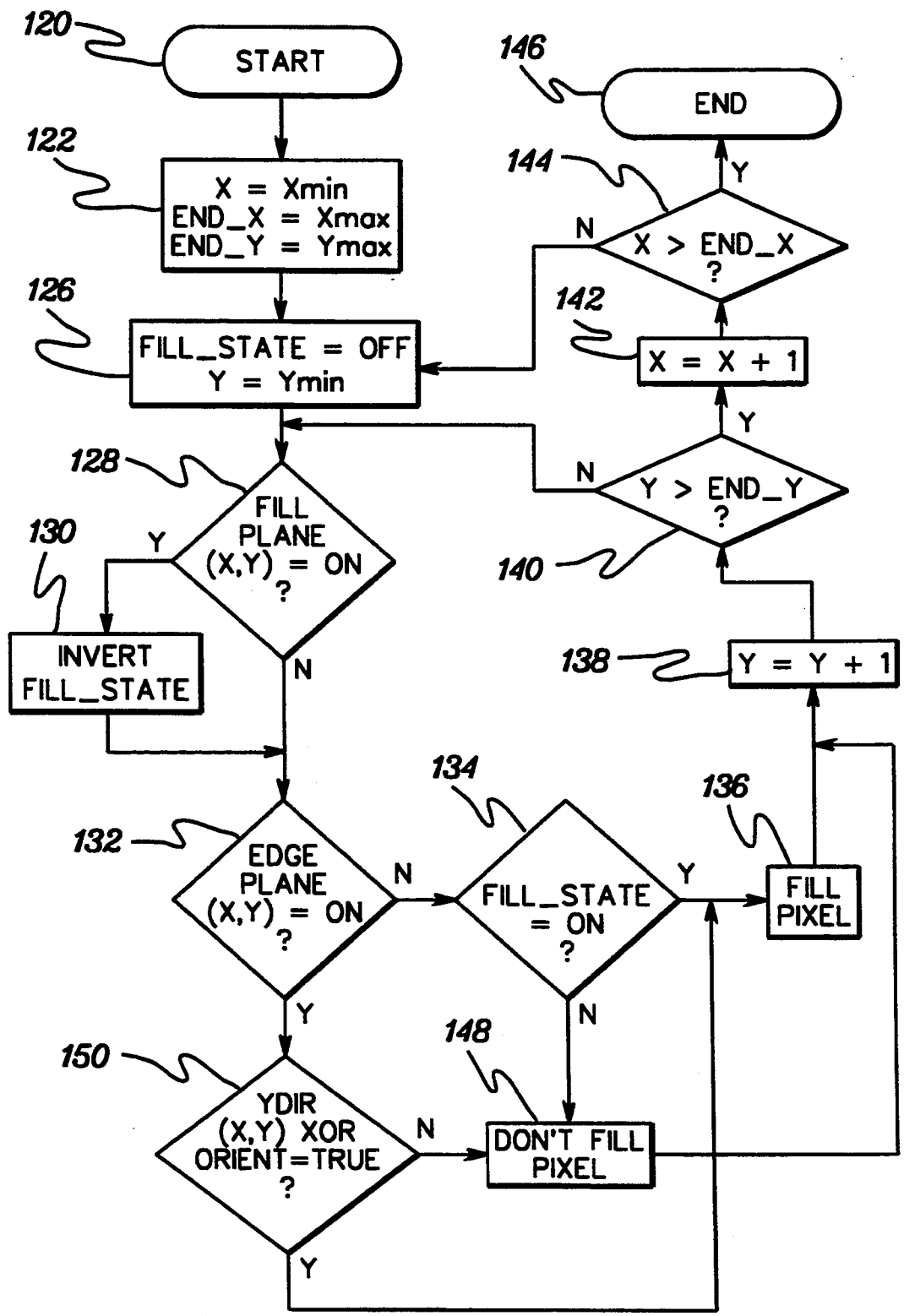
FIG. 13 depicts one example of a flow diagram of the filling technique of the present invention.
Figure 11:
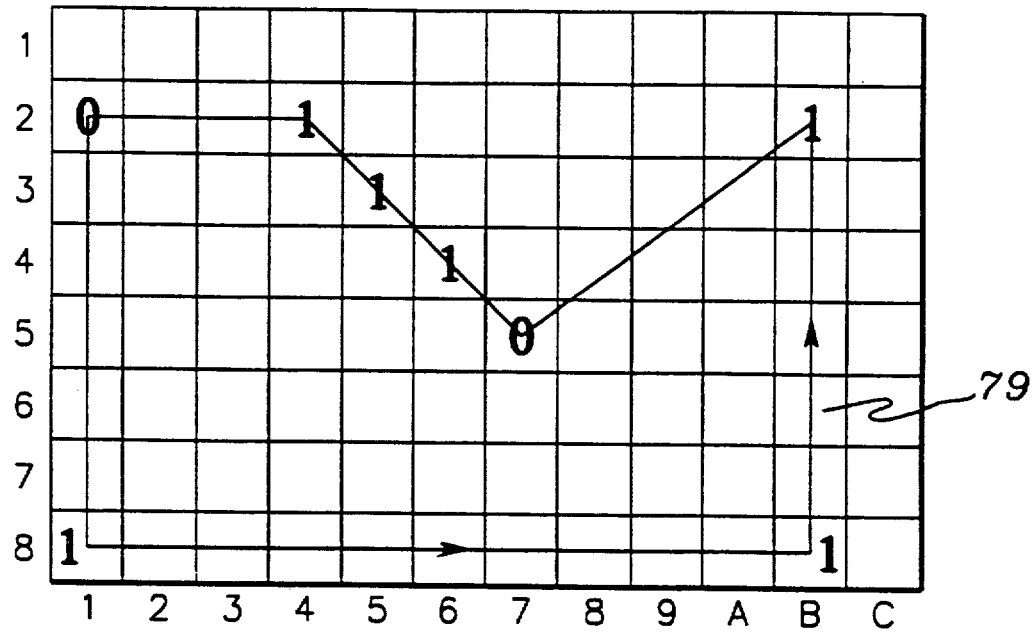
Figure 17:
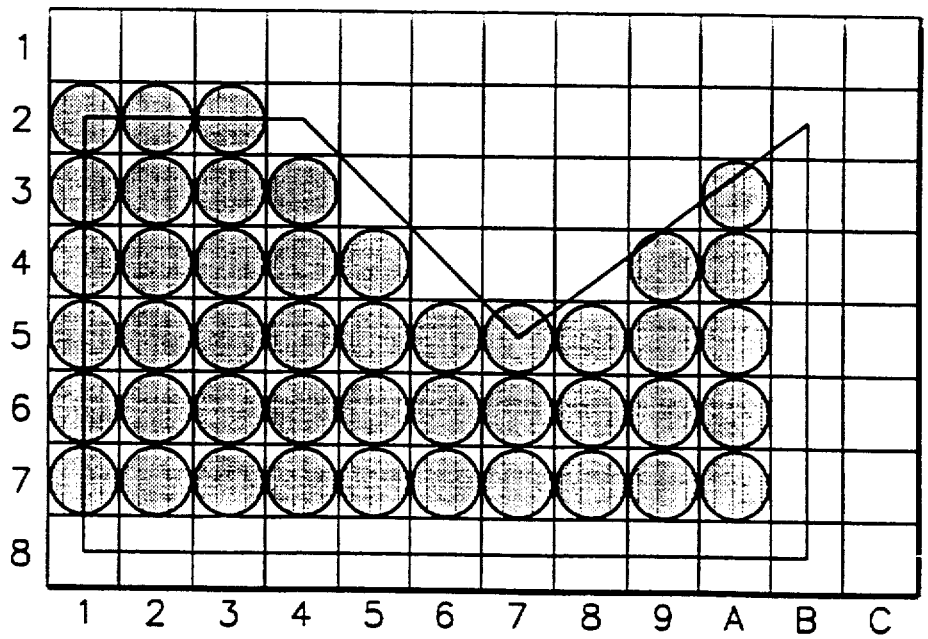

Referring to FIG. 13, when the filling of the polygon outline begins, STEP 120 "START," initially a number of signals are initialized, STEP 122 "X=MIN; END_X=XMAX; END_Y=YMAX." For example, a signal X is set equal to the value of XMIN, which represents the lowest X coordinate value of the polygon. That is, each of the starting and ending coordinates are input into a logic circuit 124 (including comparators), (FIG. 14) which compares each horizontal component (X component) to the value of XMIN (initially XMIN is set to the first horizontal component of the polygon outline) and if the horizontal component is less than XMIN, XMIN is set to the value of the horizontal component. In addition to setting X, a signal END_X is set equal to the value of XMAX, which represents the maximum X coordinate for the polygon outline. XMAX is calculated similar to XMIN. That is, comparator 124 compares each incoming horizontal component to the value of XMAX (initially XMAX is set to the first horizontal component of the polygon outline) and, if the horizontal component is greater than XMAX, XMAX is set to the value of the horizontal component. Similarly, a signal END_Y is set equal to YMAX, which represents the maximum Y coordinate of the polygon outline. YMAX is calculated in a like manner as XMAX, except the Y components (or vertical components) are compared instead of the X coordinates.

In addition to the above, a flag referred to as FILL_STATE is initialized to OFF (e.g., set to zero) and a signal Y is set equal to YMIN, STEP 126 "FILL_STATE=OFF; Y=YMIN." YMIN is calculated in a similar way as XMIN, except the vertical components are compared. The smallest vertical component of a given polygon outline represents YMIN. XMIN, XMAX, YMIN and YMAX are used to identify the filling extent of the polygon outline.

Returning to FIG. 13, next, an inquiry is made into whether the value at location X,Y of FILL plane 46 is set to 1 (ON state), INQUIRY 128, "FILL_PLANE (X,Y)=ON?" If the value at the highest portion of the outline (i.e. location X,Y which was previously set equal to XMIN, YMIN, respectively) is set to one, the FILL_STATE flag is inverted (e.g., set to one), STEP 130 "INVERT FILL_STATE" and control is passed to INQUIRY 132, described below.

Returning to INQUIRY 128, if the value at location X,Y of the FILL_PLANE is off (i.e., set to zero), control passes to INQUIRY 132 "EDGE PLANE (X,Y)=ON?" Should the value at X,Y of the edge plane be equal to zero, another inquiry is made into whether the FILL_STATE flag is set to one, INQUIRY 134 "FILL_STATE=ON?" Should the FILL_STATE flag be equal to one, the pixel at location X,Y is filled, STEP 136 "FILL PIXEL." Thereafter, Y is incremented by 1, STEP 138, "Y=Y+1" and a determination is made as to whether the maximum point of the polygon has been reached, INQUIRY 140 "Y>END_Y?" If Y is not greater than the value of END_Y and thus, the maximum point of the polygon outline has not been reached, control passes to STEP 128 "FILL PLANE (X,Y)=ON?"

Returning to INQUIRY 140, if Y is greater than END_Y, then that vertical span is complete and the value of X is incremented by one, STEP 142 "X=X+1." Subsequent to incrementing X, an inquiry is made into whether there are any more vertical spans to be spanned, INQUIRY 144 "X>END_X?" If X is greater than END_X, then all of the vertical spans have been spanned and the polygon outline is filled, STEP 146 "END." Should X be less than or equal to END_X, flow passes to STEP 126.

Returning to INQUIRY 134, if the FILL_STATE flag is equal to zero, then the pixel at location X,Y of the display device is not filled (i.e., value at X,Y is zero), STEP 148 "DON'T FILL PIXEL."

Returning to INQUIRY 132, if the value at location X,Y of the edge plane is equal to one, then a determination is made as to whether the exclusive OR of the value at location X,Y of the YDIR plane with the value of a signal ORIENT, described below, is equal to one, indicating whether the direction is correct for the orientation of the polygon outline (clockwise vs. counterclockwise), INQUIRY 150 "YDIR (X,Y) XOR ORIENT=TRUE?" If the resulting value of the exclusive OR is equal to zero, then the pixel is not filled, STEP 148 "DON'T FILL PIXEL" and, if the value is equal to one, the pixel is filled, STEP 136 "FILL PIXEL." Thereafter, flow proceeds from either STEP 148 or STEP 136, as described previously.

The signal, ORIENT, used in the above inquiry, indicates whether the polygon outline is being rendered in a clockwise or counterclockwise manner. It is determined by, for example, circuit 124. In order to determine this, the following equation is used:

$$\sum_{k=0}^{sides} (X_k \times dY_k - Y_k \times dX_k)$$

Where (X,Y) is the starting point of an edge and (dX,dY) is the change in X and Y, respectively, along the edge. The above equation calculates the area of the polygon outline by using cross products and, based on the sign of the result, a determination is made as to the orientation of the polygon (i.e., clockwise or counterclockwise).

Figure 15:
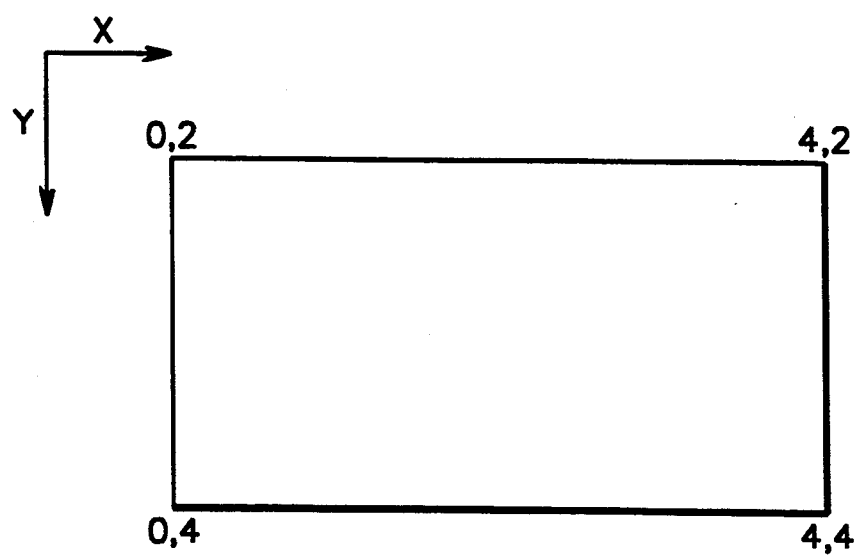
FIG. 15 depicts one example of a polygon outline used as an example in determining rendering orientation, in accordance with the principles of the present invention.

As an example, using the above equation, the area of the rectangle depicted in FIG. 15 is calculated as follows:

For the first edge, starting at 0,4 and ending at 4,4 (· refers to multiplication)

$A_1 = X \cdot dY - Y \cdot dX$ $A_1 = 0 \cdot 0 - 4 \cdot 4$ $A_1 = -16$

For the second edge, starting at 4,4 and ending at 4,2:

$A_2 = X \cdot dY - Y \cdot dX$ $A_2 = 4 \cdot -2 - 4 \cdot 0$ $A_2 = -8$

For the third edge, starting at 4,2 and ending at 0,2:

$A_3 = X \cdot dY - Y \cdot dX$ $A_3 = 4 \cdot 0 - 2 \cdot -4$ $A_3 = 8$

For the fourth edge, starting at 0,2 and ending at 0,4:

$A_4 = X \cdot dY - Y \cdot dX$ $A_4 = 0.2 - 2.0$ $A_4 = 0$

The sum of the four results $(A_1+A_2+A_3+A_4)$ equals $-16$ (i.e., $-16+(-8)+8+0=-16$), whose magnitude is equal to twice the area of the polygon outline. Further, since the sign of the result is negative, the rendering direction of the polygon is counterclockwise (ORIENT=1). If it was positive, then the rendering direction would be clockwise (ORIENT=0).

Referring to FIG. 16, one embodiment of the hardware used for the filling technique of the present invention is described. A span coordinate generator 152 is used to generate an X,Y coordinate. Span coordinate generator 152 which includes standard logic circuits, receives as input XMAX, XMIN, YMAX and YMIN and produces therefrom X and Y. Subsequently, X and Y are passed to a control plane unit 154. In particular, the result at location X,Y of fill plane 46 of control plane unit 154 is exclusive OR'ed (reference number 155) with the output of a latch 156, which represents the value of the previous fill_state indicator (initially, latch 156 is set to zero). The output of XOR 155 is input to latch 156, such that the value of XOR 155 may be used during the next clock cycle.

In addition to the above, the output of XOR 155 is input to AND gate 158. Also input to AND gate 158 is the inverted value of the value located at X,Y of the edge plane. That is, when the value at location X,Y of the edge plane is zero, then the value of AND gate 158 represents the output value of XOR 155. The output of AND gate 158 is passed to OR gate 160.

OR gate 160 also receives as input, the output of AND gate 162, which receives as input the value at location X,Y of the edge plane and the output of XOR 164. XOR 164 receives as input the value of ORIENT, described above and the value at location X,Y of the YDIR plane. The output of OR gate 160 is equal to a one, indicating a fill of the pixel at location X,Y, when one of the following conditions exist:
  (a) The bit at location X,Y of the EDGE control plane and the YDIR plane is equal to one and the rendering orientation is clockwise;
  (b) The bit at location X,Y of the EDGE control plane is equal to one, the bit at location X,Y of the YDIR plane is equal to zero and the rendering orientation is counterclockwise; and
  (c) The bit at location X,Y of the EDGE plane is equal to zero and the fill state indicator is equal to one.

Figure 17:
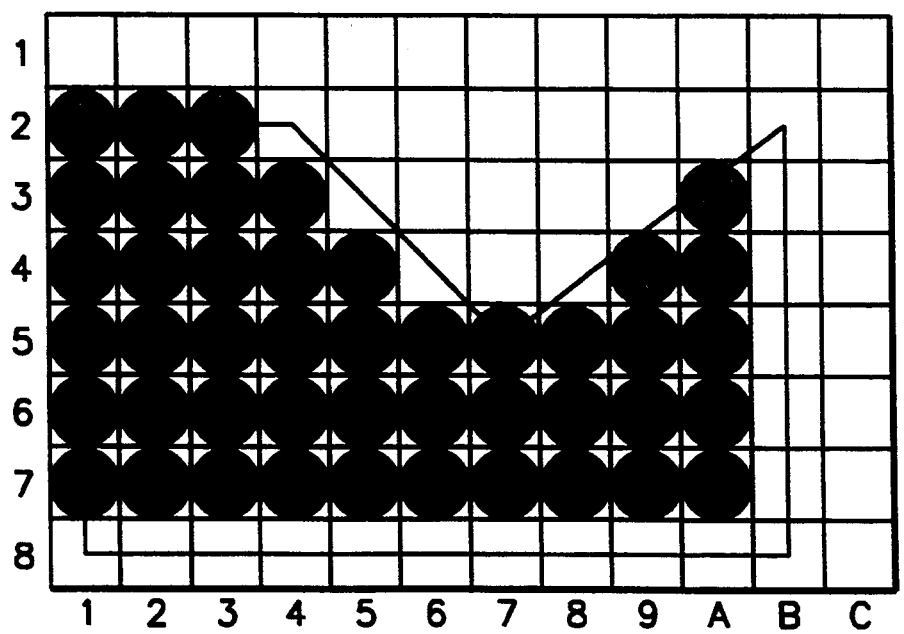
FIG. 17 depicts one example of a filled polygon outline filled using the X EvenOdd rules and the techniques of the present invention.

Depicted in FIG. 17 is one example of a filled polygon outline, which is filled in accordance with the principle of the present invention. As is shown, only pixels on or below the edges, or to the right of the edges are filled, in accordance with the known X Window EvenOdd Rules. In accordance with the principles of the present invention, the pixels of the rightmost edge are not filled and the last pixels of each vertical span are not filled.

Using the above technique for filling a polygon outline, in accordance with the principles of the present invention, the outline is filled using vertical spans. For each pixel in the vertical span whose fill control bit is equal to one and the fill_state flag is equal to one, filling begins. Filling continues for each pixel in the vertical span until another pixel is encountered in the fill control plane 46, which is set to one. When another location in plane 46 having one is reached (i.e., in the same vertical span), filling ceases and the pixel set with a one is not filled. In addition, the fill_state flag is set to zero.

Using the above rendering and filling techniques, in accordance with the principles of the present invention, a polygon outline is rendered and filled in accordance with the X EvenOdd rules. The filling is accomplished by using vertical spans which are implemented in hardware.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for rendering a polygon outline having one or more edges in a graphics processor, each of said one or more edges represented by one or more pixels, said polygon outline comprising N vertical spans, each of said N vertical spans having a beginning point and an ending point, said rendering method comprising the steps of:
  setting bits to a first value in a first plane at locations corresponding to pixels representing said beginning point and said ending point of each of said N−1 vertical spans;
  setting bits to said first value in a second plane at locations corresponding to pixels having a center lying on each oblique edge of said polygon outline, and corresponding to pixels having a center lying on a beginning of each of said one or more edges and an ending of each of said one or more edges;
  determining a direction relative to a Y-axis for each bit set to said first value in said second plane; and
  setting bits in a third plane at locations corresponding to said set bits in said second plane, said bits in said third plane being set to said first value when said direction determining step indicates said direction of said set bits in said second plane is a first direction and said bits in said third plane being set to a second value when said direction determining step indicates said direction of said set bits in said second plane is a second direction.

2. The rendering method of claim 1, wherein said first value is a binary one and said second value is a binary zero.

3. The rendering method of claim 1, wherein said first direction is a negative direction and said second direction is a positive direction.

4. The rendering method of claim 1, wherein said bits are set to said first value in said first plane in accordance with a first plane predetermined relationship.

5. The rendering method of claim 1, wherein said bits are set to said first value in said second plane in accordance with a second plane predetermined relationship.

6. The rendering method of claim 1, wherein said bits are set to said first value in said third plane in accordance with a third plane predetermined relationship.

7. The rendering method of claim 1, further comprising the step of identifying said pixels representing said polygon outline.

8. The rendering method of claim 7, wherein said identifying step comprises the steps of:
  (a) determining a beginning coordinate and an ending coordinate for one of said one or more edges of said polygon outline;

(b) selecting a pixel closest to said edge defined by said beginning and ending coordinates;

(c) determining whether said selected pixel is on or below said edge;

(d) stepping in a Y direction when said selected pixel is not on or below said edge, thereby selecting another pixel to represent said edge;

(e) repeating steps (b)–(d) until said ending coordinate is reached; and (f) repeating steps (a)–(e) for each of said one or more edges of said polygon outline.

9. The method of claim 1, further comprising the step of filling said rendered polygon outline.

10. The method of claim 9, wherein said filling step comprises the steps of:

(a) determining a filling extent surrounding said rendered polygon outline to be filled, said extent defining an area comprising a plurality of vertical scan lines;

(b) vertically scanning each scan line to determine sets of active pixels in each vertical scan line, each set comprising a first active pixel and a second active pixel, said first and second active pixels having inactive pixels therebetween; and (c) for each vertical scan line rendering said first active pixels in each set of active pixels and rendering said inactive pixels in between said set of active pixels.

11. The method of claim 10, further comprising the step of setting an indicator active when said first active pixel is determined.

12. The method of claim 11, further comprising the step of setting said indicator inactive when said second active pixel is determined.

13. The method of claim 9, further comprising the steps of:

(a) determining a location for filling to begin;

(b) determining whether said first value is stored at said location of said second plane;

(c) determining a rendering orientation when said first value is stored at said location of said second plane, said rendering orientation being one of a clockwise orientation and a counterclockwise orientation;

(d) determining whether said first value is stored at said location of said third plane;

(e) filling said pixel when said rendering orientation is clockwise and said first value is stored at said location of said third plane; and (f) filling said pixel when said rendering orientation is counterclockwise and said first value is not stored at said location of said third plane.

14. The method of claim 13, wherein said location is defined by an X coordinate and a Y coordinate, said X coordinate representing one of said N vertical spans and said Y coordinate representing a pixel within said one of said N vertical spans.

15. The method of claim 14, further comprising the steps of:

(g) determining whether any more pixels exist in said one of said N vertical spans; and (h) repeating steps (a)–(f) for each of said pixels existing in said one of said N vertical spans.

16. The method of claim 15, further comprising the steps of:

determining whether any more vertical spans exist in the polygon outline; and repeating steps (a)–(g) for each of said vertical spans in the polygon outline.

17. The method of claim 9, further comprising the steps of:

(a) determining a location for filling to begin;

(b) determining whether a fill indicator is equal to said first value; and (c) filling said pixel when said fill indicator is equal to said first value and said first value is not stored at said location of said second plane.

18. The method of claim 17, wherein said location is defined by an X coordinate and a Y coordinate, said X coordinate representing one of said N vertical spans and said Y coordinate representing a pixel within said one of said N vertical spans.

19. The method of claim 18, further comprising the steps of:

(d) determining whether any more pixels exist in said one of said N vertical spans; and (e) repeating steps (a)–(c) for each of said pixels existing in said one of said N vertical spans.

20. The method of claim 19, further comprising the steps of:

determining whether any more vertical spans exist in the polygon outline; and repeating steps (a)–(e) for each of said vertical spans in the polygon outline.

21. A system for rendering a polygon outline having one or more edges in a graphics processor, each of said one or more edges represented by one or more pixels, said polygon outline comprising N vertical spans, each of said N vertical spans having a beginning point and an ending point, said system comprising:

means for setting bits to a first value in a first plane at locations corresponding to pixels representing said beginning point and said ending point of each of said N−1 vertical spans;

means for setting bits to said first value in a second plane at locations corresponding to pixels having a center lying on each oblique edge of said polygon outline, and corresponding to pixels having a center lying on a beginning of each of said one or more edges and an ending of each of said one or more edges;

means for determining a direction relative to a Y-axis for each bit set to said first value in said second plane; and means for setting bits in a third plane at locations corresponding to said set bits in said second plane, said bits in said third plane being set to said first value when said direction determining step indicates said direction of said set bits in said second plane is a first direction and said bits in said third plane being set to a second value when said direction determining step indicates said direction of said set bits in said second plane is a second direction.

22. The system of claim 21, wherein said first value is a binary one and said second value is a binary zero.

23. The system of claim 21, wherein said first direction is a negative direction and said second direction is a positive direction.

24. The system of claim 21, further comprising means for identifying said pixels representing said polygon outline.

25. The system of claim 24, wherein said identifying means comprises:

means for determining a beginning coordinate and an ending coordinate for an edge of said polygon outline;
means for selecting a pixel closest to said edge defined by said beginning and ending coordinates;
means for determining whether said selected pixel is on or below said edge; and
means for stepping in a Y direction when said selected pixel is not on or below said edge, thereby selecting another pixel to represent said edge.

26. The system of claim 21, further comprising means for filling said rendered polygon outline.

27. The system of claim 26, wherein said filling means comprises:
means for determining a filling extent surrounding said rendered polygon outline to be filled, said filling extent defining an area comprising a plurality of vertical scan lines;
means for vertically scanning each scan line to determine sets of active pixels in each vertical scan line, each set comprising a first active pixel and a second active pixel, said first and second active pixels having inactive pixels therebetween; and
means for rendering for each vertical scan line said first active pixels in each set of active pixels and rendering said inactive pixels in between said set of active pixels.

28. The system of claim 27, further comprising means for setting an indicator active when said first active pixel is determined.

29. The system of claim 28, further comprising means for setting said indicator inactive when said second active pixel is determined.

30. The system of claim 26, further comprising:
means for determining a location for filling to begin;
means for determining whether said first value is stored at said location of said second plane;
means for determining a rendering orientation when said first value is stored at said location of said second plane, said rendering orientation being one of a clockwise orientation and a counterclockwise orientation;
means for determining whether said first value is stored at said location of said third plane;
means for filling said pixel when said rendering orientation is clockwise and said first value is stored at said location of said third plane; and
means for filling said pixel when said rendering orientation is counterclockwise and said first value is not stored at said location of said third plane.

31. The system of claim 30, wherein said location is defined by an X coordinate and a Y coordinate, said X coordinate representing one of said N vertical spans and said Y coordinate representing a pixel within said one of said N vertical spans.

32. The system of claim 31, further comprising means for determining whether any more pixels exist in said one of said N vertical spans.

33. The system of claim 32, further comprising means for determining whether any more vertical spans exist in the polygon outline.

34. The system of claim 26, further comprising:
means for determining a location for filling to begin;
means for determining whether a fill indicator is equal to said first value; and
means for filling said pixel when said fill indicator is equal to said first value and said first value is not stored at said location of said second plane.

35. The system of claim 34, wherein said location is defined by an X coordinate and a Y coordinate, said X coordinate representing one of said N vertical spans and said Y coordinate representing a pixel within said one of said N vertical spans.

36. The system of claim 35, further comprising means for determining whether any more pixels exist in said one of said N vertical spans.

37. The system of claim 36, further comprising means for determining whether any more vertical spans exist in the polygon outline.

* * * * *

UNITED STATES PATENT AND TRADEMARK OFFICE
CERTIFICATE OF CORRECTION

PATENT NO. : 5,371,843
DATED : December 6, 1994
INVENTOR(S) : Gerald P. Pomichter, Jr.

It is certified that error appears in the above-indentified patent and that said Letters Patent is hereby corrected as shown below:

The sheet of drawings consiting of figure 17, should be deleted to appear as per attched sheet.

UNITED STATES PATENT AND TRADEMARK OFFICE
CERTIFICATE OF CORRECTION

PATENT NO. : 5,371,843

DATED : December 06, 1994

INVENTOR(S) : Gerald P. Pomichter, Jr.

It is certified that error appears in the above-indentified patent and that said Letters Patent is hereby corrected as shown below:

Column 8, line 16, after (-6) delete "32" and replace with -- = --.

Column 12, line 2, delete "PH" and replace with -- ¬PH --.

Column 13, line 4, delete "((PT1" and replace with -- ¬((PT1 --.

Column 18, line 52, delete "-Y-dX" and replace with -- -Y•dX --.

Signed and Sealed this

Ninth Day of May, 1995

Attest:

BRUCE LEHMAN

Attesting Officer

Commissioner of Patents and Trademarks